(12) United States Patent
Linton

(10) Patent No.: US 9,575,616 B2
(45) Date of Patent: Feb. 21, 2017

(54) EDUCATOR EFFECTIVENESS

(71) Applicant: School Improvement Network, LLC, Midvale, UT (US)

(72) Inventor: Chet Dee Linton, Sandy, UT (US)

(73) Assignee: SCHOOL IMPROVEMENT NETWORK, LLC, Midvale, UT (US)

( * ) Notice: Subject to any disclaimer, the term of this patent is extended or adjusted under 35 U.S.C. 154(b) by 83 days.

(21) Appl. No.: 13/721,461

(22) Filed: Dec. 20, 2012

(65) Prior Publication Data

US 2013/0111363 A1    May 2, 2013

Related U.S. Application Data

(63) Continuation-in-part of application No. 13/570,839, filed on Aug. 9, 2012, now Pat. No. 9,262,746.

(60) Provisional application No. 61/523,156, filed on Aug. 12, 2011, provisional application No. 61/523,187, filed on Aug. 12, 2011, provisional application No. 61/654,813, filed on Jun. 2, 2012.

(51) Int. Cl.
| | |
|---|---|
| *G06F 3/048* | (2013.01) |
| *G06Q 10/06* | (2012.01) |
| *H04L 12/18* | (2006.01) |
| *G06Q 50/20* | (2012.01) |
| *H04L 29/06* | (2006.01) |

(52) U.S. Cl.
CPC .............. *G06F 3/048* (2013.01); *G06Q 10/06* (2013.01); *H04L 12/1831* (2013.01); *G06Q 50/20* (2013.01); *G06Q 50/205* (2013.01); *H04L 12/1813* (2013.01); *H04L 12/1818* (2013.01); *H04L 29/06408* (2013.01); *H04L 29/06414* (2013.01)

(58) Field of Classification Search
CPC ...... H04L 65/4015; H04L 67/02; H04L 12/02; H04L 12/1822; H04L 29/06027; H04L 29/06176
USPC ......................................................... 709/226
See application file for complete search history.

(56) References Cited

U.S. PATENT DOCUMENTS

| | | | |
|---|---|---|---|
| 4,375,080 A | 2/1983 | Barry et al. | |
| 4,798,543 A | 1/1989 | Spiece | |
| 5,002,491 A | 3/1991 | Abrahamson et al. | |

(Continued)

OTHER PUBLICATIONS

Goals 2000: Reforming Education to Improve Student Achievement, Apr. 30, 1998, retrieved online Dec. 16, 2011, 9 pgs.

(Continued)

*Primary Examiner* — Tom Y Chang
(74) *Attorney, Agent, or Firm* — Patent Law Works LLP

(57) ABSTRACT

Various implementations for managing, monitoring, and promoting user development and effectiveness are described. In one example implementation, a system includes a management module, an assessment module, a content module, and a reporting module. The management module determines a goal for a plurality of users of an organization to meet and a workflow for achieving the goal. The assessment module determines an assessment of a first performance of the first user based on the workflow and personalizes an electronic resource to a need of the first user based on the assessment of the performance. The content module provides the first electronic resource to the first user for interaction and the reporting module generates a report describing the electronic resource and the assessment of the first performance.

31 Claims, 8 Drawing Sheets

(56) References Cited

U.S. PATENT DOCUMENTS

| | | |
|---|---|---|
| 5,372,507 A | 12/1994 | Goleh |
| 5,528,281 A | 6/1996 | Grady et al. |
| 5,590,057 A | 12/1996 | Fletcher et al. |
| 5,601,436 A | 2/1997 | Sudman et al. |
| 5,712,906 A | 1/1998 | Grady et al. |
| 5,737,600 A | 4/1998 | Geiner et al. |
| 5,749,736 A | 5/1998 | Griswold et al. |
| 5,787,156 A | 7/1998 | Katz |
| 5,788,508 A | 8/1998 | Lee et al. |
| 5,802,283 A | 9/1998 | Grady et al. |
| 5,823,788 A | 10/1998 | Lemelson et al. |
| 5,890,911 A | 4/1999 | Griswold et al. |
| 5,898,762 A | 4/1999 | Katz |
| 5,957,699 A | 9/1999 | Peterson et al. |
| 5,987,443 A | 11/1999 | Nichols et al. |
| 6,024,577 A | 2/2000 | Wadahama et al. |
| 6,039,575 A | 3/2000 | L'Allier et al. |
| 6,064,856 A | 5/2000 | Lee et al. |
| 6,075,968 A | 6/2000 | Morris et al. |
| 6,099,320 A | 8/2000 | Papadopoulos |
| 6,112,049 A | 8/2000 | Sonnenfeld |
| 6,149,441 A | 11/2000 | Pellegrino et al. |
| 6,155,840 A | 12/2000 | Sallette |
| 6,157,808 A | 12/2000 | Hollingsworth |
| 6,190,178 B1 | 2/2001 | Oh |
| 6,282,404 B1 | 8/2001 | Linton |
| 6,301,462 B1 | 10/2001 | Freeman et al. |
| 6,302,698 B1 | 10/2001 | Ziv-El |
| 6,386,883 B2 | 5/2002 | Siefert |
| 6,496,681 B1 | 12/2002 | Linton |
| 6,556,974 B1 | 4/2003 | D'Alessandro |
| 6,676,413 B1 | 1/2004 | Best et al. |
| 6,760,748 B1 | 7/2004 | Hakim |
| 6,782,396 B2 | 8/2004 | Greene et al. |
| 6,789,047 B1 | 9/2004 | Woodson |
| 6,904,263 B2 | 6/2005 | Grudnitski et al. |
| 6,944,596 B1 | 9/2005 | Gray et al. |
| 6,974,328 B2 | 12/2005 | Aspe et al. |
| 7,254,782 B1 | 8/2007 | Sherer |
| 7,593,861 B2 | 9/2009 | Morrel-Samuels |
| 7,689,712 B2 | 3/2010 | Lee et al. |
| 7,949,552 B2 | 5/2011 | Korenblit et al. |
| 8,005,709 B2 | 8/2011 | King et al. |
| 8,275,305 B2 | 9/2012 | Hutchinson et al. |
| 2001/0039002 A1 | 11/2001 | Delehanty |
| 2002/0091656 A1 | 7/2002 | Linton |
| 2002/0146676 A1 | 10/2002 | Reynolds |
| 2002/0194029 A1 | 12/2002 | Guan et al. |
| 2003/0046265 A1 | 3/2003 | Orton et al. |
| 2003/0228561 A1 | 12/2003 | Escalante |
| 2003/0232314 A1 | 12/2003 | Stout et al. |
| 2004/0018477 A1 | 1/2004 | Olsen |
| 2004/0063085 A1 | 4/2004 | Ivanir et al. |
| 2004/0076941 A1 | 4/2004 | Cunningham et al. |
| 2005/0026119 A1 | 2/2005 | Ellis et al. |
| 2005/0026131 A1 | 2/2005 | Elzinga et al. |
| 2005/0033633 A1 | 2/2005 | LaPasta et al. |
| 2006/0141430 A1* | 6/2006 | Hutchinson ............ G09B 7/02 434/236 |
| 2006/0147882 A1 | 7/2006 | Sambucetti et al. |
| 2007/0190504 A1 | 8/2007 | Schwartz et al. |
| 2008/0003552 A1* | 1/2008 | Supe ............................ 434/162 |
| 2008/0014569 A1 | 1/2008 | Holiday et al. |
| 2008/0288485 A1 | 11/2008 | Lager et al. |
| 2009/0031215 A1 | 1/2009 | Collier, II et al. |
| 2009/0035733 A1 | 2/2009 | Meitar et al. |
| 2010/0010880 A1 | 1/2010 | Toth et al. |
| 2010/0205027 A1* | 8/2010 | Draper, Jr. ........... G06Q 10/063 705/7.36 |
| 2010/0306016 A1 | 12/2010 | Solaro et al. |
| 2011/0039249 A1 | 2/2011 | Packard et al. |
| 2011/0047224 A1* | 2/2011 | Fox .............................. 709/206 |
| 2011/0053133 A1 | 3/2011 | Rock et al. |
| 2011/0065082 A1* | 3/2011 | Gal ........................ G09B 7/02 434/365 |
| 2011/0070567 A1 | 3/2011 | Linton |
| 2011/0076664 A1 | 3/2011 | Holt et al. |
| 2012/0029962 A1 | 2/2012 | Podgurny et al. |
| 2012/0159337 A1* | 6/2012 | Travilla ............. G06Q 30/0631 715/738 |
| 2012/0264098 A1 | 10/2012 | Megargel et al. |
| 2012/0276516 A1 | 11/2012 | Teskey et al. |
| 2012/0281095 A1 | 11/2012 | Trenciansky et al. |
| 2012/0310696 A1 | 12/2012 | Toth |
| 2013/0073331 A1 | 3/2013 | Nudd |
| 2013/0130217 A1 | 5/2013 | Dohring et al. |
| 2013/0130219 A1* | 5/2013 | Elzinga et al. ............... 434/362 |
| 2013/0332804 A1 | 12/2013 | Seaman et al. |
| 2014/0033040 A1 | 1/2014 | Thomas et al. |
| 2015/0026174 A1 | 1/2015 | Nuggehalli et al. |

OTHER PUBLICATIONS

International Preliminary Report on Patentability, PCT/US2011/035438, Oct. 31, 2011, 6 pgs.

International Search Report and Written Opinion for PCT/US12/50079, Nov. 2, 2012, 8 pgs.

Ginsburg et al. "Online Professional Development for Mathematics Teachers: A Strategic Analysis", [online]. Dated Jun. 2004. Retrieved from the Internet at URL:<http://www.nationaltechcenter.org/documents/opdpaperayeditsjune2004_000.doc>, on Oct. 1, 2012, 86 pgs.

International Search Report, PCT/US2013/039819, Aug. 30, 2013, 10 pgs.

* cited by examiner

EDUCATOR EFFECTIVENESS

CROSS-REFERENCE TO RELATED APPLICATIONS

This application claims the benefit under 35 U.S.C. §120 and is a continuation-in-part of U.S. application Ser. No. 13/570,839, entitled "Prescription of Electronic Resources Based on Observational Assessments", filed on Aug. 9, 2012, which claims the benefit under 35 U.S.C. §119(e) of U.S. Provisional Application No. 61/523,156, entitled "Observation 360", filed on Aug. 12, 2011, Provisional Application No. 61/523,187, entitled "Student Assessment Data", filed on Aug. 12, 2011, and Provisional Application No. 61/654,813, entitled "Teacher Effectiveness Systems and Methods", filed on Jun. 2, 2012, all of which are hereby incorporated by reference in their entirety.

BACKGROUND

Technical Field

The present disclosure relates to computing, and more particularly to managing, monitoring, and promoting user development and effectiveness.

Description of Related Art

In recent years, some educational systems have been implementing increasingly rigorous educational standards defining what students are expected to competently learn in order to be considered acceptably educated. However, these educational systems can be limited in reliably determining how their educators are performing relative to these standards or providing the educators that are struggling to meet the standards with the targeted assistance and resources they need to improve. For instance, these educational systems may be slow or unable to identify and address the specific needs and deficiencies of their educators, and thus fail to maximize their students' potential and negatively affect their students' achievement, such as level of knowledge, testing performance, and actual student learning. In some cases, these educational systems are slow to act due to the use of obsolete legacy systems and resources to manage their educators. For instance, these educational systems may use paper-based observation and evaluation assessment methods that can be misplaced, lost, or forgotten about. Additionally, even when eventually entered into a central human resource management system, the assessment results may require further manual processing and interpretation before any action is taken to address any needs or deficiencies revealed by the results.

Furthermore, these educational systems often use various combinations of disparate systems, some manual, some computerized, to manage various aspects of their organizations. In some cases, each of these disparate systems may provide a separate tool for evaluating employees formally or informally, providing training, providing evidence, managing human resources, managing student achievement, etc. However, due to the lack of integration between these systems, it is often difficult for the administrators to tell how their organizations are performing, either as a whole, or by grade, department or individual, which can result in considerable amount of time passing before any action is taken to address the needs of their organizations or employees. Moreover, actions taken by these administrators are often ineffective as the administrators lack the information they need to target their actions to the needs of their organizations or members.

SUMMARY

According to one innovative aspect of the subject matter described in this disclosure, a system includes a management module, an assessment module, a content module, and a reporting module. The management module determines a goal for a plurality of users of an organization to meet and a workflow for achieving the goal. The assessment module determines an assessment of a first performance of the first user based on the workflow and personalizes an electronic resource to a need of the first user based on the assessment of the performance. The content module provides the first electronic resource to the first user for interaction and the reporting module generates a report describing the electronic resource and the assessment of the first performance.

In general, another innovative aspect of the subject matter described in this disclosure may be embodied in a method that includes determining a goal for a plurality of users of an organization to meet; determining a workflow for achieving the goal; determining an assessment of a first performance of the first user based on the workflow; personalizing a first electronic resource to a need of the first user based on the assessment of the first performance; providing the first electronic resource to the first user for interaction; and generating a report describing the first electronic resource and the assessment of the first performance.

Other implementations of one or more of these aspects include corresponding systems, apparatus, and computer programs, configured to perform the actions of the methods, encoded on computer storage devices.

The technology described herein provides many benefits including, but not limited to, preparing educators to get their students to be college and career ready by providing all the tools necessary in order to implement, track, and drive a full educator effectiveness and evaluation system across a school or district. For example, the technology integrates all the components necessary in order to give every educator a truly personalized professional learning plan. By using that personalized professional learning plan, every educator can help every child in his/her class be college and career ready. The technology also gives educators, such as administrators, the tools necessary to define a process and track every educator in the district or school to ensure that they have the observations necessary, receive the personalized professional development based on those observations, and then go through the school's or district's evaluation process. Further, the technology can provide rich reporting and analytics functionality allowing the district to get the necessary data and generate the necessary reports for full compliancy with a governing body, such as a state or federal government, and can include a repository providing access to effectiveness evidence for the educators of the district, which may include samples of student work, teacher and/or student assessment results (e.g., observation and evaluation results), activity logs, lesson plans, and other information that demonstrates the educators' effectiveness. The technology can also provide educators with an easy-to-use platform that gives them access to numerous professional development videos and other electronic resources designed to help them implement best practices in the classroom.

It should be understood, however, that this list of features and advantages is not all-inclusive and many additional features and advantages are within the scope of the present disclosure. Moreover, it should be noted that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Example System

Figure 1:
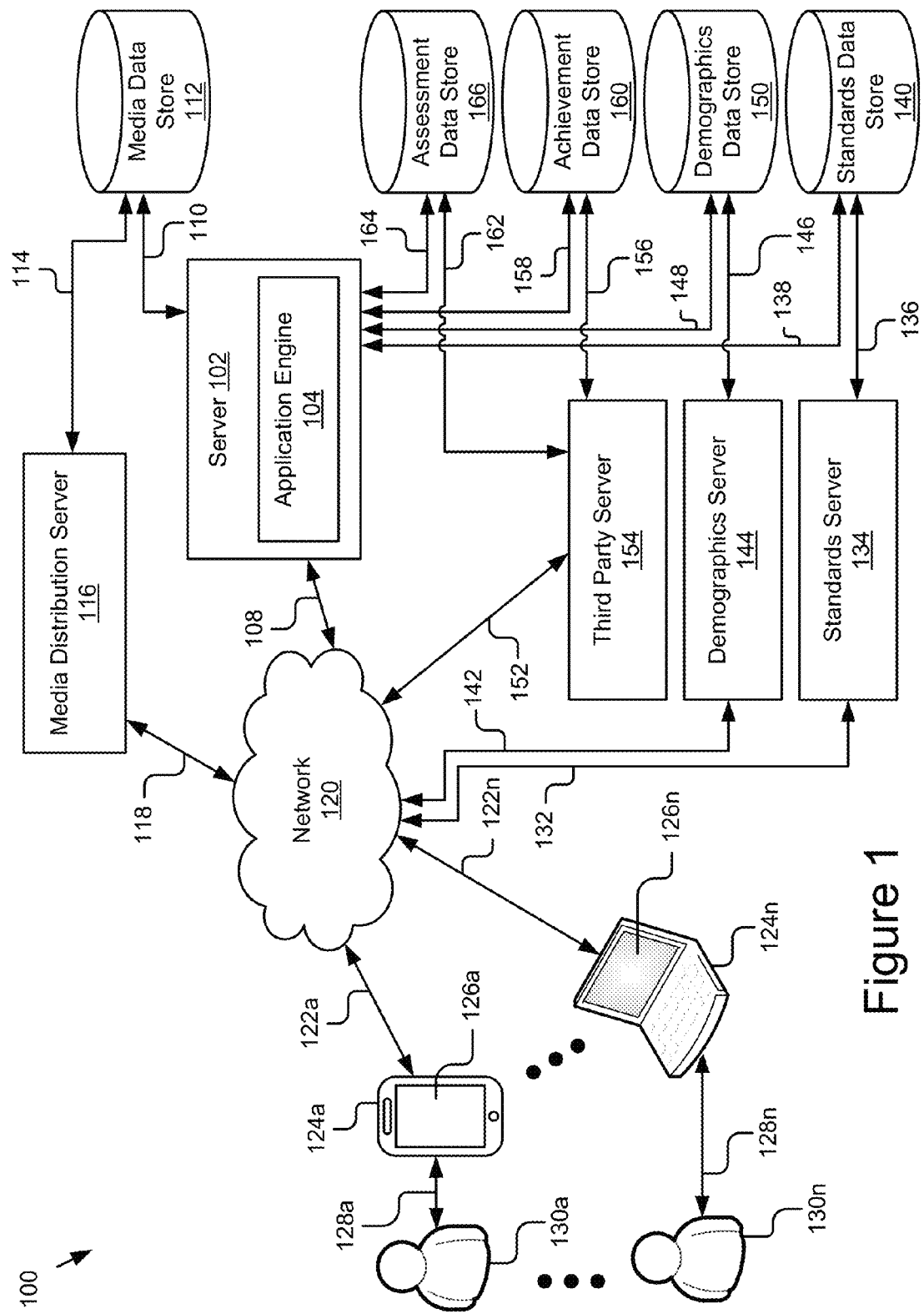
FIG. 1 is a block diagram illustrating an example system for managing, monitoring, and promoting user development and effectiveness.

FIG. 1 is a block diagram illustrating an example system 100 for managing, monitoring, and promoting user development and effectiveness. More particularly, the system 100 is capable, among other things, of determining goals and objectives (e.g., for meeting mission critical needs); determining and managing a workflow for meeting the goals and objectives including defining process steps, defining assessment criteria, scheduling activities and events, and determining an organization-wide training program; providing users with electronic training resources including video, audio, interactive books, community tools, access to groups and learning communities, etc.; providing tools for observing and assessing the performance of users and their subordinates or pupils; providing feedback and assigning training resources to address user needs and improve user performance; performing assessments (e.g., formal and information evaluations); prescribing, real-time, training resources that can be personalized to a user's needs for completion the user; tracking user progress by generating and providing rich, informative reports based on assessment data, achievement data, demographics data, standards data, interaction data, etc.

While the present disclosure is, in some cases, described in the context of education, it is applicable to any field. For instance, the system 100 is applicable to and can be used by any group or workforce that requires training and assessment, including, for example, students, educators, professors, and administrators, health care professionals such as nurses or physicians, legal professionals such as lawyers, judges or trustees, corporate professionals such as officers, directors, managers or other internal corporate employees, travel industry professionals such as pilots, drivers, skippers or the like, financial professionals such as accountants, brokers, traders, tax specialists or the like, human relations professionals, sales professionals, service industry professionals, government employees, law enforcement personnel, military personnel, sports professionals and/or personnel, homeland security personnel, and the like.

In the depicted embodiment, the system 100 includes a server 102, a media distribution server 116, client devices 124a . . . 124n (also referred to herein individually and collectively as 124) that are accessed by users 130a . . . 130n (also referred to herein individually and collectively as 130), a third-party server 154, a demographics server 144, and a standards server 134. In the illustrated embodiment, these entities are electronically communicatively coupled via a network 120. While only one network 120 is depicted as coupling the server 102, the media distribution server 116, the client devices 124a . . . 124n, the third-party server 154, the demographics server 144, and the standards server 134, in practice any number of networks 120 can be connected to or interconnect these entities.

The network 120 may include any number of wired or wireless networks that provide interconnected data paths across which multiple devices may communicate. The network may have any number of configurations or topologies, such as a star configuration, token ring configuration, or other known configurations. For example, the network 120 may include, but is not limited to, a local area network (LAN), a wide area network (WAN) (e.g., the Internet), mobile (cellular) networks including distributed radio networks and a hub providing a wireless wide area network (WWAN), a Bluetooth® communication network, a WiFi™ hotspot, etc. The network 120 may transmit data using a variety of different network communication protocols. Example communication protocols include, but are not limited to, user datagram protocol (UDP), transmission control protocol (TCP), hypertext transfer protocol (HTTP), hypertext transfer protocol secure (HTTPS), file transfer protocol (FTP), direct data connection, various email or video streaming protocols, etc. Computing devices such as client devices 124 and servers 102, 116, 134, 144, and 154 may couple to and communicate via the network 120 using wireless and/or wired connections.

The server 102, the media distribution server 116, the third-party server 154, the demographics server 144, and the standards server 134 may each include one or more processors and one or more storage devices storing data or instructions for execution by the one or more processors. For example, the servers 102, 116, 154, 144, and/or 134 may each include a server, a server array or any other computing device, or group of computing devices, having data processing, storing, and communication capabilities. In another example, the servers 102, 116, 154, 144, and/or 134 may include a virtual server (i.e., a virtual machine) implemented via software. For instance, the virtual server can operate in a host server environment and accesses the physical hardware of the host server including, for example, a processor, memory, storage, network interfaces, etc., via an abstraction layer (e.g., a virtual machine manager). It should be understood that the servers 102, 116, 154, 144, and/or 134 may be made up of any combination of devices and servers, or only one device or server. Further, while the servers 102, 116, 154, 144, and 134 are depicted as being distinct computing devices or systems, in other embodiments, one or more of these servers 102, 116, 154, 144, and 134 may be integrated into the same computing device or system or distributed among additional computing devices or systems.

In some embodiments, the entities of the system 100 including computing entities 102, 116, 134, 144, and/or 154 may be implemented using cloud-based architectures where one or more computer functions are performed by remote computing systems and devices at the request of a local computer device. For example, the computing entities 102, 116, 154, 144, and/or 134 may be a cloud-based distributed computing device or system having dynamically scalable and virtualizable resources, and various functionalities of the computing entities 102, 116, 154, 144, and/or 134 may be carried out and supplemented by computing systems and devices distributed over the network 120.

The server 102 includes an application engine 104 for providing an educational platform that includes educational, developmental, evaluative, managerial, and reporting tools and resources to facilitate user development and effectiveness. For example, in an educational setting, the educational platform can provide administrators, principals, supervisors, etc. (hereafter "administrators") with: management tools to set goals, objectives, metrics, targets, etc. (hereinafter "goals") for the educators and administrators in their organizations to meet and to define workflows including process and assessment templates based on the goals; assessment tools for assessing the performance of the educators relative to the goals and for prescribing personalized electronic resources to address the needs of educators; tools for managing professional development; and reporting tools for following the educators' progress as they move towards accomplishing the goals set forth in the workflows and, resultantly, become increasingly more effective at preparing their students to be college and career ready. In a further example, educators may interact with electronic resources offered by the platform to increase understanding and knowledge, receive personalized training, collaborate with other users, receive mentoring, map curriculum, develop lesson plans, navigate standards, gather evidence of their effectiveness, etc. These electronic resources may, in some cases, be specified as part of united professional development plans reflected by the workflows defined by the administrators.

The third-party server 154, the demographics server 144, and the standards server 134 host network-based software applications operable to provide various services or functionalities to their end-users. In some embodiments, the servers 154, 144, and 134 send data to and receive data from the server 102 and the other entities coupled to the network 120. In the depicted embodiment, the third-party server 154 is coupled to the network 120 via signal line 152 for communication with the other entities of the system 100; the demographics server 144 is coupled to the network 120 via signal line 142 for communication with the other entities of the system 100; and the standards server 134 is coupled to the network 120 via signal line 132 for communication with the other entities of the system 100. Additionally, the third-party server 154 is coupled to the achievement data store 160 and the assessment data store 166 via signal lines 156 and 162, respectively, the demographics server 144 is coupled to the demographics data store 150 via signal line 146, and the standards server 134 is coupled to the standards data store 140 via signal line 136.

In some embodiments, the third-party server 154, the demographics server 144, and the standards server 134 may store and provide access to data that is associated with users of the application engine 104.

In particular, the demographics server 144 may maintain demographics data associated with the users of the application engine 104 and/or the organizations with which they are associated (e.g., work for, attend, belong to, etc.). An organization may be any type of organized entity. For example, the organization may be an academic institution, a partnership, corporation, religious institution, military institution, non-profit organization, governmental body, municipality, or the like. In some instances, sensitive information included in the demographics data is anonymized.

By way of example, the demographics data may describe the ethnicity, race, age, gender, disabilities, mobility, socio-economic status, religious affiliation, language, location, etc. of the users and/or those they administrate, teach, or oversee; the organizational structure of the entities with which the users are associated with, such as an organization's geographic location, size, and make-up; and the changes in demographics that occur over time. As a further example, in an educational setting, the demographics of an educational system describe the system's region, district(s), school(s), grade(s), classroom(s), subject(s), students, educators, special education needs, free and reduced lunch programs, racial and ethnic makeup of students and educators, student achievement, historical data, English language learning programs, etc. For instance, the demographics information may include the educators' education, experience, grade levels taught, subjects taught, specializations, background, residence, areas of excellence or expertise, etc., and the students' grade level, achievement level, socio-economic status, ethnicity/race, spoken language, special needs, dependency on social programs, etc.

The standards server 134 may maintain standards data compiled and approved by a governing body which define requirements, standards, metrics, benchmarks, etc. (hereinafter "standards") that are applicable to users of the system 100. For example, in an educational setting, the standards may establish the levels of attainment pupils must reach to be considered acceptably educated or competent. The governing body may be an organization as described above. For example, in an educational setting, the governing body may be a governmental legislative or administrative body tasked with setting educational standards for primary, secondary, and post-secondary school systems.

The third-party server 154 maintains assessment and achievement data applicable to users of the system 100. In some embodiments, the third-party server 154 maintains this data in association with the online services it provides. For example, the third-party server may provide online services for human resource management, surveying, standardized testing, personalized learning, accreditation, or the like. The third-party server 154 is not limited to providing the above-noted services and may include any other network-based or cloud-based service. For simplicity, a single block for the third-party server 154 is shown. However, in other embodiments, several distinct third-party servers (not shown) may be coupled to the network via distinct signal lines to provide distinct or competing services.

The achievement data may include data representing achievements of the users, such as test scores, grades, or other marks for evaluating the users themselves or those they administrate, teach, or otherwise oversee, as well as sample work product for the users as evidence of their competency/proficiency. For example, in an educational setting, the achievement data may include data describing how the students of educators achieved relative to applicable educational standards. Additional examples of achievement data include, but are not limited to college admission test data (e.g., ACT, SAT, etc.), advanced placement (AP) test data, state standardized test data, federal standardized test data, grades, other summative or formative assessment data, etc.

The assessment data may include data representing assessments of the users. An assessment is any formal or informal evaluative measure for determining user performance and user perceptions. In an educational setting, for example, an assessment may include a formal evaluation, informal evaluation, formative assessment, summative assessment, student review of an educator (e.g., teacher or administrator), observation-based assessment, peer review, parent review, a student self assessment, an educator self assessment, rater reliability data, sample of student work, sample of educator work, such as a lesson plan or curriculum map, etc., and the assessment data includes data representing the assessment. The assessment data may also include assessments reflected by the achievement data, including, for example, an assessment of an educator's performance based on his/her students' achievement-based performance, as discussed elsewhere herein. In a further example, the assessment data for a given educator may include formal and informal evaluations performed by an administrator, supervisor, or human resources representative, formative assessments of teaching performance, student reviews, student performance, peer reviews, mentor or coach reviews, etc. The achievement data and assessment data may be segmented by various criteria including, for example, organizational characteristics, such as district, school, administrator, teacher, subject, grade, student, etc.

In the depicted embodiment, the servers 134, 144, and 154 respectively maintain their data in the data stores 140, 150, and 160 and 166, which are information sources for storing data and providing access to stored data. In some embodiments, the data stores 112, 140, 150, and 160 and 166 are respectively included in the memories of the servers 116 and/or 102, 134, 144, and 154. In other embodiments, the data stores 112, 140, 150, and 160 and 166 are each included in a server or storage system distinct from but respectively accessible by the servers 116 and/or 102, 134, 144, and 154. For example, one or more of the data stores 112, 140, 150, 160, and 166 may be storage systems distributed over the network 120, such as an intranet or the Internet. Further, while the data stores 112, 140, 150, 160, and 166 are depicted in FIG. 1 as distinct entities, in other embodiments, one or more of these data store 112, 140, 150, 160, and 166 may be integrated into the same storage devices or systems, or further segmented into additional storage devices or systems.

In some embodiments, the servers 134, 144, and 154 can respectively provide the server 102 access to data stored in the data stores 140, 150, and 160 and 166. For example, these servers 134, 144, and 154, may provide secure access to data respectively stored in the data stores 140, 150, and 160 and 166 over the network 120 via APIs. In other embodiments, the server 102 is directly coupled to the data stores 140, 150, 160, and 166 via signal lines 138, 148, 158, and 164, respectively, to access (e.g., store, modify, and retrieve) the data stored therein. In some embodiments, the third-party server 154, the demographics server 144, and the standards server 134 may require system 100 entities to be registered and authenticate in order to access the data maintained by them.

In some embodiments, one or more of the data stores 112, 140, 150, 160, and 166 may include a database management system (DBMS) executable by a processor to manage a collection of records, files, and objects including the media objects. For example, the data stores 112, 140, 150, 160, and 166 may include a structured query language (SQL) DBMS and/or a "not only SQL" (NoSQL) DBMS. As a further example, the DBMS may store data in multi-dimensional tables having rows and columns, and manipulate, i.e., insert, query, update and/or delete, rows of data using programmatic operations.

While FIG. 1 depicts various components as being distinct, it should be understood that one or more of these components may be combined, reorganized, or further segregated without departing from the scope of this disclosure. For instance, one or more of the servers 102, 116, 154, 144, 134 and the data stores 112, 140, 150, 160, and 166 may be combined in to a single computer system or further divided into additional systems and devices, while still providing the functionality described herein.

The client devices 124*a* . . . 124*n* are computing devices having data processing and data communication capabilities. In various embodiments, the client devices 124 may include one or more of wired or wireless network interfaces for sending and receiving network data; a graphics processor; a monitor (e.g., LCD, high-resolution touchscreen, etc.); a physical keyboard; forward and rear facing cameras; sensors such as accelerometers and/or gyroscopes; a GPS receiver; a Bluetooth® module; memory storing applicable firmware; various physical connection interfaces (e.g., USB, HDMI, headset jack, etc.); etc. Additionally, an operating system for managing the hardware and resources of the client device 124, drivers and application programming interfaces (APIs) for providing applications access to the hardware and resources, a user interface module for generating and displaying interfaces for user interaction and input, and applications such as applications for making phone calls, video calls, web browsing, messaging, playing-back multimedia, social networking, gaming, capturing digital video and/or images, word processing, etc., may be stored in a memory and operable by a processor of the client device 124. The client devices 124*a* . . . 124*n* may be computing devices of the same type or of different types. For example, the client device 124 may be a desktop computer, a laptop, or a handheld wireless device, which is capable of sending and receiving voice and/or data communications.

In the depicted embodiment, the client device 124*a* is coupled to the network 120 via signal line 122*a* and the user 130*a* interacts with the client device 124*a* as depicted by line 128*a*, and the client device 124*n* is coupled to the network 120 via signal line 122*n* and the user 130*n* interacts with the client device 124*n* as depicted by line 128*n*. While FIG. 1 illustrates two or more client devices 124, the present disclosure applies to any system architecture having one or more client devices. The client devices 124*a* and 124*n*, as depicted, respectively contain instances 126*a* and 126*n* of a client application 126. These instances 126*a* and 126*n* are also collectively and independently referred to herein as the client application 126. In some embodiments, these instances 126*a* and 126*n* reflect the same client application 126. In other embodiments, these instances 126*a* and 126*n* may be distinct from one another in compilation but can provide similar functionality to the end-user.

The client application 126 may be stored in a memory (not shown) of a user device 124 and accessible and executable by a processor (not shown) to render user interfaces, receive user input, and process data, and send data to and receive data from the application engine 104. In some embodiments, the client application 126 generates and presents user interfaces to a user 130 via a display (not shown). For example, the client application 126 may generate and present the user interface 700 depicted in FIG. 7 based at least in part on information received from the application engine 104 via the network 120. In some embodiments, the client application 126 is code operable in a browser launched on the user device 124, the browser receives interface instructions from the application engine 104 of the server 102 via the network 120 in the form of a mark-up language (e.g., HTML, XML, etc.), style sheets (e.g., CSS, XSL, etc.), graphics, and/or scripts (e.g., JavaScript, ActionScript, etc.), and the browser interprets the interface instructions and renders an interactive Web User Interface (WUI) for display on the user device 124 based thereon. In other embodiments, some or all of the interface instructions are provided by the client application 126, or by another locally or remotely operated application that specifies that the content be formatted and displayed according to an organization's specific needs and/or standards. Other variations are also contemplated and within the scope of this disclosure. The client application 126 is also operable to receive input signals from the user 130 via an input device (not shown) of the user device 124, and to send information to the application engine 104 via a communication unit (not shown) coupled to the network 120, such as one like or substantially similar to the communication unit 210.

Example Server 102

Figure 2A:
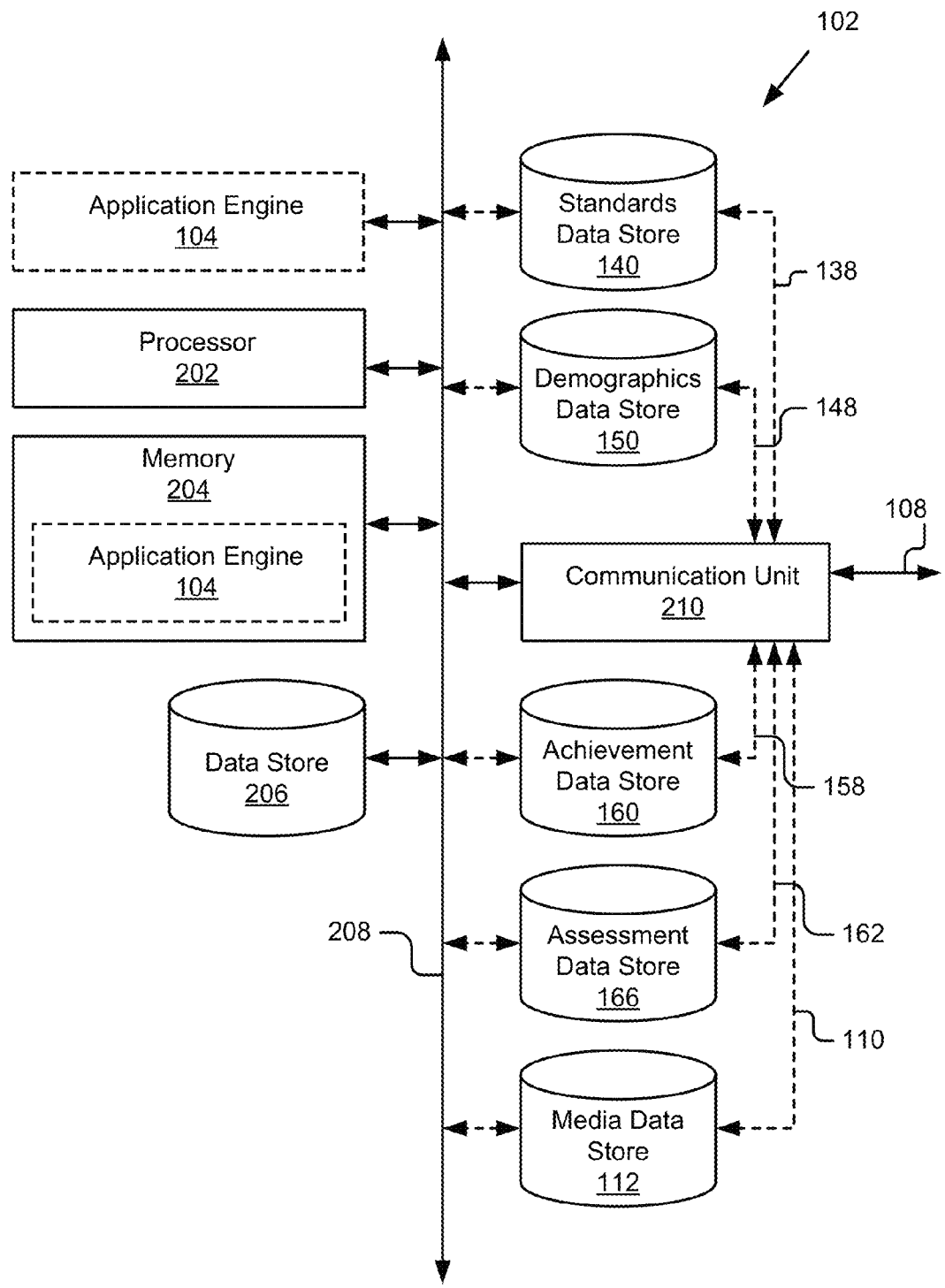
FIG. 2A is a block diagram illustrating an example server.

FIG. 2A is a block diagram of an example server 102. In the depicted embodiment, the server 102 includes one or more computing devices having a processor 202, a memory 204, a data store 206, and a communication unit 210, which are communicatively coupled via a communication bus 208. The server 102 also includes an application engine 104. The communication bus 208 can be any type of conventional communication bus for transferring data between components of a computing device, or between computing devices.

In some embodiments, one or more of the data stores 140, 150, 160, 166, and 112 may also be included in and coupled to the bus 208. For example, the data stores 140, 150, 160, 166, and 112 may be local instances of the data stores 140, 150, 160, 166, and 112 depicted in FIG. 1, and the server 102 may update these local instances at regular intervals (e.g., using a batch process) to reflect the data stored and maintained remotely. In other embodiments, the server 102 may aggregate data from the remote data stores 140, 150, 160, 166, and 112 and store it in the data store 206. In yet other embodiments, the server 102 may access data stored by the remote data stores 140, 150, 160, 166, and 112 via the network 120 real-time. It should be understood that these embodiments are provided by way of example, and other configurations are contemplated and fall within the scope of this disclosure. Moreover, the server 102 depicted in FIG. 2A is provided by way of example and it should be understood that the server 102 may take other forms and include additional or fewer components without departing from the scope of the present disclosure. For example, some or all of the data stores depicted in FIG. 2A may be consolidated into a single data store, or further divided into additional data stores without departing from the scope of the present disclosure. In another example, while not shown, the server 102 may include other components, such as an operating system, and input and output devices (e.g., a computer display, a keyboard and mouse, etc.), etc. In some embodiments, the computer architecture depicted in FIG. 2A may be applicable to the other entities of the system 100, such as the servers 134, 144, and 154.

The processor 202 includes an arithmetic logic unit, a microprocessor, a general-purpose controller, or some other processor array to perform computations and provide electronic display signals to a display device (not shown). The processor 202 may be coupled to the bus 208 for communication with the other components of the server 102. The processor 202 may process data signals and may have various computing architectures including a complex instruction set computer (CISC) architecture, a reduced instruction set computer (RISC) architecture, or an architecture implementing a combination of instruction sets. Although only a single processor 202 is shown in FIG. 2A, multiple processors may be included. The processor 202 may be capable of supporting the display of images and the capture and transmission of images, perform complex tasks, including various types of feature extraction and sampling, etc. It should be understood that the server 102 may include various operating systems, sensors, displays, additional processors, and other physical configurations.

The memory 204 stores instructions and/or data that may be executed by the processor 202. The memory 204 is coupled to the bus 208 for communication with the processor 202 and the other components of server 102. The instructions and/or data may comprise code for performing any and/or all of the techniques described herein. For example, the memory 204 may store the application engine 104, an operating system, drivers, and various other software. The memory 204 may include a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 202. A non-transitory computer-usable storage medium may include any and/or all computer-usable storage media. In some embodiments, the memory 204 may include volatile memory, non-volatile memory, or both. For example, the memory 204 may include a dynamic random access memory (DRAM) device, a static random access memory (SRAM) device, a read-only memory (ROM), flash memory, a hard disk drive, a floppy disk drive, a CD ROM device, a DVD ROM device, a DVD RAM device, a DVD RW device, a flash memory device, or any other mass storage device known for storing information on a more permanent basis. It should be understood that the memory 204 may be a single device or may include multiple types of devices and configurations.

The communication unit 210 is an interface for sending data to and receiving data from other computing devices. In the depicted embodiment, the communication unit 210 is coupled to the network 120 by the signal line 108. The communication unit 210 may also be coupled to the media data store 112 via signal line 110, coupled to the data stores 140, 150, 160, and 166 via signal lines 138, 148, 158, 164, and coupled to the bus 208. In some embodiments, the communication unit 210 includes a network interface device (I/F) for wireless or wired connectivity to the network 120. For example, the communication unit 210 may include a wireless transceiver, a CAT-type interface, USB interface, SD interface, etc. The communication unit 210 may, in some embodiments, send and receive signals via the network 120 using Wi-Fi™, Bluetooth®, or various cellular protocols. The communication unit 210 can link the processor 202 to the network 120 that may in turn be coupled to other processing systems. The communication unit 210 can provide connections to the network 120 and to other entities of the system 100 using various communication protocols including, for example, those discussed above with reference to the network 120.

Example Application Engine 104

Figure 2B:
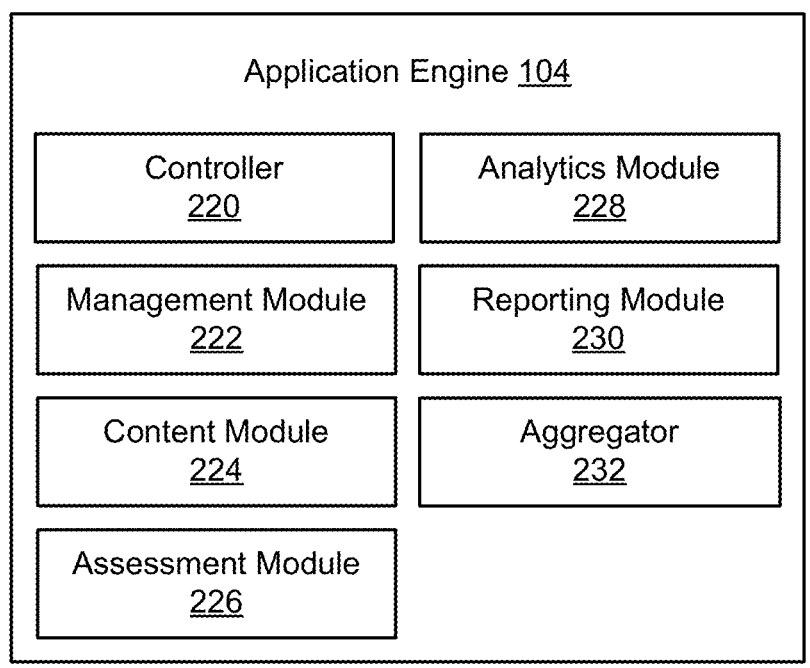
FIG. 2B is a block diagram illustrating an example application engine.

In the depicted embodiment, the server 102 includes an application engine 104, which is software, code, logic, or routines for providing the educational platform discussed above with reference to at least FIG. 1. As depicted in FIG. 2B, the application engine 104 may include, among other modules, a controller 220, a management module 222, a content module 224, an assessment module 226, an analytics module 228, a reporting module 230, and an aggregator 232. In other embodiments, one or more of these modules 220, 222, 224, 226, 228, 230, and 232 may be integrated into a single module or divided into additional modules.

In various embodiments, the application engine 104 and its sub-components 220, 222, 224, 226, 228, 230, and 232 may be sets of instructions executable by the processor 202, or logic included in one or more customized processors (e.g., specific integrated circuits (ASICs)), to provide their respective functionalities; or may be stored in the memory 204 (e.g., RAM, PROM, FPROM, ROM, hard disk, etc.) of the server 102 and are accessible and executable by the processor 202 to provide their respective functionalities. In any of these embodiments, the application engine 104 and its components 220, 222, 224, 226, 228, 230, and 232 may be adapted for cooperation and communication with the processor 202 and other components of the server 102.

The controller 220 is software, code, logic, or routines for receiving requests from the other entities of the system 100 and handling those requests. In some embodiments, the controller 220 receives requests for electronic resources, data, instructions, reports, etc. For example, the controller 220 may receive a request for an electronic training resource and may relay the request to the content module 224, and, responsive thereto, the content module 224 may provide the electronic training resource to the entity requesting it. Other examples of requests that may be received include, but are not limited to, requests for information or reports, management-related requests including goal/workflow definitions, assessment-related requests including requests for observation templates, observation files, assignments, to review evidence of understanding, etc. In some embodiments, the controller 220 is communicatively coupled to the management module 222, the content module 224, the assessment module 226, the analytics module 228, the reporting module 230, and the aggregator 232 to relay the requests and/or associated information to these components. The controller may, in various instances, signal the foregoing components to perform their respective operations and provide information to the entity requesting it.

The management module 222 is software, code, logic, or routines for setting and managing goals for the users of an organization to meet and defining and managing workflows for achieving the goals. A goal may be or include any, purpose, target, objective, mark, etc. In some embodiments, a goal may be tied to a standard reflected by the standards data. In other embodiments, a goal may be loosely related or unrelated to the standards data. For instance, the goal may be targeted to specific needs of a school system, educator/employee, etc. A goal that is tied to a standard may include related objectives that must be met for the goal to be considered achieved. A workflow is based on the goal(s) and defines the mode (e.g., process) for achieving it. A workflow may include assessment and/or process templates.

An assessment template is a user-definable electronic form for assessing how a target user is performing relative to one or more criteria (e.g., goals, workflows, standards, etc.). The assessment template can be used for a self-assessment or an assessment of a user by another user (e.g., an administrator, a subordinate, a peer, a third party, etc.). In some embodiments, the assessment template includes assessment fields for describing the performance (e.g., compliance, effectiveness, achievement, attainment, efficacy, attitude, perception, etc.) of the target user relative to the criterion. The assessment templates may also include assignment fields for recommending, assigning and/or integrating electronic resources (e.g., video); and fields for defining assignment parameters for the electronic resources (e.g., task timers, wait times, etc.). The assignment fields may be populated with electronic resources defined in a corresponding process template or that are user-defined directly. Additionally or alternatively, the assessment module 224 may provide electronic resource suggestions for assignment via the assignment fields, as discussed in further detail below.

By way of example, an administrator user may define an assessment template to include performance rubrics; questions regarding user-performance relative to the performance rubrics; user-configurable answers to the questions, which gauge the target user's performance; comment fields for providing a description of a target user's performance; video and/or photos to be taken during an assessment demonstrating effectiveness or samples of effectiveness, etc. The assessment templates are advantageous is a number of respects including providing an administrator with the ability to specify the criteria by which the performance of the members of the organization he or she administrates is measured and the type and content of assessment data that should be collected.

A process template is a user-definable form for establishing a process for achieving the goals and tracking progress. In some embodiments, the process templates can be defined to include one or more practical steps for achieving the goal(s). For example, a process template may set forth one or more meetings, events, activities, professional development resources, and assessments, etc., as well as a schedule for completing these items. In a further example, the process template can be used to manage professional development. For instance, the process template may establish an organization-wide development plan and may specify the electronic resources that each member of the organization must consume (i.e., read, view, interact with, share, etc.) within a certain timeframe. For example, in an educational setting, the process template may assign professional development activities that each educator must complete according to schedule, including, for example, one or more of online training videos the educators much watch, online communities the educators must participate in, electronic books the educators must read, and tools the educators must use to map their curriculum, develop their lesson plans, develop their own personal development plans, etc.

In some embodiments, a user 130, interacting with the management module 222 via the client application 126, may define a new goal or workflow or modify an existing goal or workflow. For example, the user may define or modify a goal and/or workflow and may transmit data describing the definition or modification via the network 120 to server 102 for processing and storage by the management module 222. In some instances, when defining or modifying a workflow, a user may, via the client application 126, refer back to previously created workflows and goals for reference, or may copy an existing goal or workflow and modify it. In some embodiments, the management module 222 ensures proper procedures are being followed and provides reminders to the users. For instance, a workflow (e.g., a process template and/or assessment template) may include a requirement that certain procedures and protocols be adhered by the users and a setting instructing the management module 222 to track compliance with these procedures and protocols and/or remind the users (e.g., via electronic message) about the procedures and protocols. The management module 222 may track compliance by using the analytics data, achievement data, assessment data, and other data stored in the data stores of the server 102 to determine whether such procedures and protocols are being followed.

In some embodiments, the management module 222 is coupled to the data store 206 to store management data describing the goals and workflows for access and retrieval by the other components of the application engine 104. For example, data reflecting the goals and workflows is accessible from the data store 206 by the analytics module 228 and the reporting module 230 for analysis and inclusion in reports, respectively.

The content module 224 is software, code, logic, or routines for providing electronic resources for consumption and tracking user consumption and interaction with those electronic resources. In some embodiments, the content module 258 can catalog the electronic resources, provide for the addition or removal of electronic resources, transmit the electronic resources to the users of the service for consumption, track user consumption and interaction with the of electronic resources, personalize electronic resources to the preferences of the users or to address the needs of the users, etc. The users may be registered or unregistered users. In some embodiments, the content module 224 can provide content that serves as a gateway portal for the users and provides them an entry point upon logging into the server 102 via their respective client devices 124 to access the various information and resources provided by the application engine 104. The content module 224 can also provide a catalog of electronic resources available to the users, provide for the addition or removal of electronic resources, transmit the electronic resources to the users of the service for consumption, and log user interaction with the electronic resources. For instance, a user may upload a video to the content module 224 and the content module 224 may catalog it accordingly, and provide it to the user or other users upon request.

In addition to its plain and ordinary meaning, an electronic resource may include any electronic media for conveying information. An electronic resource can include one or more of textual data, graphical data, video data, audio data, etc. For example, the electronic resource may include a dataset having text, graphics, video, and/or audio, etc., embedded therein. As a further example, the electronic resource may be a webpage including one or more of text, graphics, video, audio, etc. In another example, the electronic resource may be or include a downloadable or streamable media object, including, for example, an electronic document (e.g., portable document format (PDF) document), electronic book (e-book), digital video, digital audio file, vector graphics file, etc.

The electronic resources may embody various tools included in the educational platform, such as, but not limited to, educational resources, publications, reference texts, online courses, lesson plans, planning tools, community forums, sharing tools, curriculum mapping tools, effectiveness evidence (e.g., work samples) viewer, an industry standards viewer, portfolio tools etc. The users of the application engine 104 may access these electronic resources for a number of purposes including, but not limited to, receiving personal or professional development, collaborating with other users, completing assignments, completing coursework, creating lesson plans, mapping curriculum to standards, receiving feedback from supervisors, etc.

The content module 224 is capable of receiving requests for electronic resources from users 130 and fulfilling those requests by transmitting instances of the electronic resources to the corresponding client devices 124 of the users 130 or facilitating the transmission of instances of the resources by the media distribution server 116 (e.g., by providing an object or code (e.g., a media player object) to the client device 124 that is operable to access the resources via the media distribution server 116). By way of example, the content module 258 may receive a request from a client device 124 of a user 130 via the network 120 to view a training video that was assigned to the user 130 by an observer while observing that user 130 in action. In another example, upon logging in to the service, a user 130 may be presented with an interface by a client application 124 operable on the client device 124 that shows any outstanding assignments that the user 130 must complete, the dates by the assignments must be completed, a description of what the assignments are, etc. Example assignments include, but are not limited to, requiring users to view a video, upload a video, create a lesson plan, provide a lesson plan, map curriculum, attend an event (e.g., class), provide student work, provide student assessment or achievement data, receive mentoring, etc. Using this interface, the user may select an assignment, in response to which the client application 124 transmits a request to the content module 258 for the electronic resource associated with the assignment. The content module 258, upon receiving this request, may locate the electronic resource in the media data store 112 and provide it to the client application 124 via the network 120 for presentation to the user 130. The content module 258 may, in some embodiments, cooperate with the media distribution server 116 to provide the electronic resources for consumption and/or interaction by the users 130 requesting them.

The content module 224 can also receive (e.g., from a client device of a user) a new electronic resource along with metadata for it and store it in the media data store 112 or the data store 206, delete or inactivate an electronic resource stored in the media data store 112 or the data store 206, and update a resource library database, either periodically or real-time, with any new electronic resources that have been added to, inactivated, or removed from the service. In some embodiments, the content module 224 may be coupled to the media data store 112, either directly or via the media distribution server 116, to access electronic resources stored therein. The electronic resources may be stored in and/or distributed across one or more data stores, such as the media data store 112 and the data store 206.

The content module 224 may personalize the electronic resources it provides. In some embodiments, the content module 224 can cooperate with the assessment module 226 to personalize the electronic resource to a need of a target user based on an assessment, as discussed in further detail below with reference to at least the assessment module 226. In other embodiments, the content module 224 can customize the content of the electronic resources based on performance-related data (e.g., assessment data, achievement data, analytics data, etc.), interaction data, demographics data, and/or any other data stored in the data stores of the system 100 and/or the server 102. For instance, based on a need reflected the performance-related data, the content module 224 may adjust the content of an electronic resource being provided to the user to address that need. As a further example, the content module 224 may provide the user with a specific video example or an electronic book having customized chapters or sections that teach additional skills and provide additional information on a topic that the user is struggling with or may provide recommendations of supplemental resources containing such material. The content module 224 may be coupled to the various data stores of the system 100 and the server 102 to retrieve the data stored therein and personalize the electronic resources.

When users consume or interact with the electronic resources provided by the content module 224, the content module 224 is capable of logging the consumption and interaction in the data store 206 in association with those users. In some embodiments, the content module 224 may cooperate with the client application 126 to log any user interactions with the electronic resources. For example, when a user interacts with a user interface generated and displayed by the client application 126, the client application 126 may send interaction data via the network 120 to the content module 224 for storage and analysis. Additionally or alternatively, the content module 224 may receive interaction data from the media distribution server 116. The interaction data may include, but is not limited to, the identity of the electronic resource that was interacted with, the identity of the user, the time and date of the interactions, the actions the user took (e.g., selected or hovered over a user interface element, such as a hyperlink, menu element, input field, pause button, play button, scrubbing dial, volume dial etc.; maximized the viewing field; added a comment; paged through the resource; downloaded a file; completed a survey; viewed an embedded video; shared a resource with social network connections), etc.

By way of further example, when a user accesses an electronic resource, pages through an electronic book, downloads files included with or embedded in a webpage, complete a survey associated with any electronic resource, views a video file, listens to an audio file, comments on passages of an interactive electronic book, submits lesson plans, submits curriculum maps, downloads documents, uploads files including video, audio, text, graphics, etc. (e.g., a work sample), participates in communities, groups defined by his/her social graph, or otherwise uses any other functionality provided by the client application 124 to interact with an electronic resource, the content module 224 receives interaction data describing these interactions from the client application 124 or another entity of the system, such as the media distribution server 118, and stores interaction data describing the interaction in the data store 228.

The assessment module 226 is software, code, logic, or routines for assessing user performance. The assessment module 226 may, in some embodiments, provide for observance and assessment of the performance of users and those they oversee or teach; receive, process, and store assessment data; provide recommendations for one or more electronic resources based on assessment data to address needs reflected by the assessment data; assign electronic resources based on assessment data for completion by users; etc.

In addition to its plain and ordinary meaning, assessing a user's performance may include qualitatively or quantitatively assessing a user's compliance, effectiveness, achievement, attainment, efficacy, attitude, perception, etc., relative to one or more criteria, such as goals and/or workflows defined via the management module 222 and stored in the data store 206 and/or the standards reflected by the standards data stored in the data store 206 and/or the standards data store 140. A performance assessment may reflect, relative to one or more criteria (e.g., goals, standards, etc.), a user's current performance level, a performance trend over a particular time period, a past performance level, a cumulative performance level, a specific performance level, an overall performance level, etc., (hereinafter referred to as performance level). The performance assessments may be formal or informal. For example, a performance assessment performed by the assessment module 226 may reflect a formal annual evaluation submitted to an human resources department or informal assessment of a user conducted to provide the user with feedback on the state of his or her development.

In some embodiments, the assessment module 226 may assess a user's performance by receiving assessment data that includes a performance assessment from a user. The performance assessment may reflect a self-assessment or an assessment performed by another, such as an observer. For example, the assessment data may include observation data characterizing one or more aspects of a target user's performance during an observation session performed by the observer. Continuing this example, the observer, who is interacting with the assessment module 226 via the client application 126, may input observations that are provided as observation data to the assessment module 226 and the assessment module 226 may store the assessment data in association with the target user and/or the observer in a data store such as the data store 206. In another example, video cameras may be used as an observation tool. For instance, a video camera placed in the vicinity of a target subject (e.g., a classroom) and may be used to record how the target subject is performing in his/her job (e.g., teaching his/her students). The video recording may then be submitted as observation data to the assessment module 226 (e.g., by the video camera, by a user via a client device 124, etc.). In some instances, the video recording may be submitted by an observer of the target subject along with observations input by the observer. In some instances, the video recording may be viewed by the target subject or another individual, such as an administrator, peer, etc., via a user interface presented on a client device 124, and observations about the target subject's performance may be submitted via the interface as observation data to the assessment module 226 for storage in association with the video. In some embodiments, the assessment module 226 stores the assessment data it receives in association with assessment data aggregated by other components of the application engine 104, such as the aggregator 232, for later access and retrieval by the other components of the application engine 104, such as the analytics module 228 and the reporting module 230.

The assessment module 226 is capable of suggesting one or more electronic resources for assignment to a target user. The suggestion may be based on the assessment data it receives, a related goal or workflow, a combination of the foregoing, etc. For example, based on observation data received from an observer or a user performing a self-assessment, the assessment module 226 can identify one or more electronic resources that correspond to the observation data, a workflow including a goal that the target user has been required to meet, a combination of the foregoing, etc., and recommend them for assignment to the target user. In response, the user (e.g., observer, target user, etc.) interacting with the assessment module 226 may assign the recommended electronic resource(s), and the target user, upon accessing the application engine 104 via an associated interface, may be presented with the electronic resource and/or options for interacting with the electronic resource(s) and thus completing the assignment. The assessment module 226 can identify the electronic resource(s) based on or a combination of the workflow and the assessment data.

In some embodiments, to identify one or more electronic resources for recommendation, the assessment module 226 can compare one or more of observation data, a goal, and a workflow to metadata stored with the electronic resources to identify resources that match. In other embodiments, the assessment module 226 can cooperate with the content module 224 to identify the electronic resources to recommend. In yet other embodiments, another module, such as a recommendation engine (not shown) included in the application engine 104, may identify the resources and provide the recommendations.

In some embodiments, the assessment module 226 may provide assessment templates defined via the management module 222 for completion by the users that are performing the assessments. For example, the assessment module may provide an assessment template to a user who is observing a target user, or to a target user who is performing a self-assessment. That user may input assessment-related information into the user-completable fields of the template and save the information to an observation file either by submitting it via the client application 126 to the assessment module 226 for storage as assessment data in the data store 206 in association with the target-user and observer (if applicable) or by saving it locally for later revision/submission. The assessment template may also include header fields for describing the circumstances surrounding the assessment. For instance, the assessment template may include fields for describing the identity a target user, the date the assessment was performed, the identity of the observer(s), and how the results of the assessment should be distributed and stored, etc. The assessment module 226 is coupled to the data stores 206, 140, 150, 160, 166, and/or 112 via the bus 214 to store and manipulate data including assessment data.

The analytics module 228 is software, code, logic, or routines for analyzing data processed by or accessible to the application engine 104 and generating effectiveness analytics based thereon. More particularly, the analytics module 228 can analyze the data processed by the management module 222, content module 224, assessment module 226, and aggregator 232 to generate analytics reflecting how the users of an organization are performing relative to a goal, standard, workflow, etc. Examples of analytics that can be generated include, but are not limited to, user performance, organization performance, rater reliability, electronic resource effectiveness, etc.

The following examples are provided to further illustrate various types of analytics that the analytics module 228 can generate by analyzing one or more of the assessment, achievement, standards, management, demographics, interaction, and content data. It should be understood that, like all examples discussed herein, that these examples should not be construed as limiting but as illustrative of the structure and functionality of the analytics module 228.

As a first example, the analytics module 228 can determine whether one or more users are in compliance with one or more measurement criteria by analyzing performance-related data (e.g., assessment data, achievement data, etc.) and data reflecting the criteria (e.g., assessment data, standards data, management data, etc.). For instance, in an educational setting, the analytics module 228 can analyze the assessments, student test scores, and other related information to a) determine if that educator's performance is complaint with an applicable standard, goal, workflow, etc. b) evaluate the educator's performance over time, c) determine if that educator's performance is trending upwards (i.e., improving) or downwards (worsening), d) determine if an educator needs additional training based on that educator's performance, etc.

As a second example, the analytics module 228 can determine user and organization performance levels based on one or more of assessment, achievement, standards, and management data. For instance, the analytics module 228 can determine the performance level of a user by comparing achievement data associated with individuals that the user oversees or teaches to standards data. As a further example, in an educational setting, the analytics module 228 can compare the standardized test scores (e.g., achievement data) of the students being taught by an educator to applicable testing standards (e.g., as defined by the standards data, management data, etc.) to determine if they meet the standards' minimum requirements, and then determine the performance level of the educator based on that comparison. In this way, the analytics module 228 could determine whether the educator is struggling, meeting standards, or exceeding standards (e.g., is a leader). In another instance, the analytics module 228 can base the analytics it generates on multiple performance-related data points to ensure the performance level being determined for each educator reliably reflects that educator's effectiveness. This may include analyzing the assessment data related to an educator (e.g., formative assessments, summative assessments, student assessments, peer reviews, formal evaluations, student work samples, etc.) and/or the achievement data of the educator's students (e.g., standardized test scores) relative to the standards and/or management data (e.g., applicable standards, goals, workflows, etc.).

As a third example, the analytics module 228 can determine how users are progressing in achieving the goals of a workflow applicable to them. For instance, the analytics module can analyze the assessment data and/or achievement data associated with the users to determine if the users are meeting the steps defined in a process template of the workflow or the standards defined in an assessment template of the workflow. In further instances, the analytics module 228 can how effectively the users of an organization are performing by determining how the users are progressing relative to goal(s) of a workflow including calculating performance trends relative to the goal(s), identifying the areas in which users are deficient, determining whether the deficiencies are systemic, determining whether the deficiencies identified are isolated or unique to a particular demographic, determining organization-wide deficiencies, identifying which electronic resources consumed by or assigned to the users of the organization have been effective at helping the users improve and which have not, etc. Additionally, in an educational setting, the analytics module 228 may determine if the educators and students are in compliance with standards applicable to them, whether the educators and students' performance has decreased or increased over time (e.g., the school-year), whether non-compliant educators and students largely belong to a particular demographic (e.g., speak English as a second language, are of a particular race or gender, have special needs, live in a particular location, have a particular socio-economic status, a combination of the foregoing, etc.), whether the resources used by the educators for professional development help the educators to improve over time, etc.

As a third example, the analytics module 228 can generate user and organization performance scores based on the performance-related (e.g., assessment data, achievement data, interaction data, etc.) and data reflecting one or more measurement criteria (e.g., the assessment data, management data, standards data) that are applicable to them. The scoring can be an aggregate or individualized score, based on a performance trend, and can be produced based on rater-reliability, etc. In some instances, the analytics module 228 can calculate aggregate and individual performance scores for the users and organizations based on the performance levels it determines and/or the performance levels previously determined by other entities of the system 100 and included in the performance-related data (e.g., assessment data, achievement data, etc.). For instance, the analytics module may calculate an effectiveness score for a given user based on one or more assessments of that user's performance (e.g., performed in association with the assessment module 226).

As a fourth example, the analytics module 228 can determine the reliability (e.g., accuracy, consistency, quality, dependability, etc.) of the performance assessments of target users based on assessment and achievement data. For instance, the analytics module 228 can compare an achievement-based assessment (e.g., achievement data) and an observation-based assessment (e.g., assessment data) to determine if the observation-based performance assessment of the target user is reliable. The reliability of the observation-based performance assessment can be determined by the analytics module 228 based on whether the achievement-based and the observation-based performance assessments are consistent. For instance, the analytics module 228 may determine the observation-based performance assessment to be unreliable if the observation-based performance assessment is negative and the achievement-based performance assessment is positive, or conversely, if the observation-based performance assessment is positive and the achievement-based performance assessment is negative. Further, the analytics module 228 may determine the observation-based performance assessment to be reliable if both the observation-based performance and achievement-based performance assessments were negative or positive. However, if the both the observation-based performance and the achievement-based performance assessments were neutral, the analytics module 228 may determine that the reliability of the performance assessment made the by the observer could not be verified.

As a fifth example, the analytics module 228 can determine the reliability (e.g., accuracy, consistency, quality, dependability, etc.) of the performance assessments and use those determinations to evaluate the effectiveness of those users who are performing the assessments. In some embodiments, to make this reliability determination, the analytics module 228 compares various criteria. The criteria could be any measurement criteria, such as metrics, observations, evaluations, effectiveness evidence, achievements, student assessment data, etc. For instance, the analytics module 228 can compare a first user's assessment of a target user to other users' assessments of the same target user to determine the reliability of the first user's assessment. In some instances, this comparison constitutes a rater reliability determination. In other instances, the analytics module 228 can compare assessments performed via the assessment module 226 to aggregated rater reliability data (inter, intra, etc.) to verify the accuracy of the performance assessments. In a further example, if the assessment of a target user by a first observer is grossly inconsistent with the observational assessments of that target user by other observers on the same or similar subject matter, the observational assessment of the first observer may be flagged and reported by the reporting module 230 to an administrator of the observer for further review/scrutiny. However, if they are consistent, then the analytics module 228 may record this as evidence of the assessment accuracy and reliability. In another instance, the analytics module 228 may analyze the observation files for some or all target users observed by the observer to determine the level and quality of feedback provided by the observer about those subjects. If the analytics module 228 determines that the assessments (e.g., answers, ratings, comments, etc.) for the target users made by the observer in the observation files are all the same or substantially similar, the analytics module 228 may determine that the observer is simply making the same assessments for each target user and is not performing the assessments as required. The analytics module 228 may also make a determination as to the quality of one or more assessments performed by an observer based on the level and/or variety of feedback included in the observation file(s) for one or more target users.

As a sixth example, the analytics module can determine a developmental need of a user and then identify one or more training resources that cater to that need based on the performance level of the user and the content of the electronic resources. For instance, the assessment data for a given educator may reflect that the educator is performing or progressing poorly relative to a particular standard, goal, workflow, etc., and the analytics module 228 can query the content data or interact with the content module 224 to identify a digital video that provides instruction and teaches skills to improve relative to that standard, goal, workflow, etc.

As a seventh example, the analytics module 228 can evaluate whether the electronic resources consumed by the users helped them to improve relative to one or more measurement criteria by analyzing performance-related data (e.g., assessment and/or achievement data) and interaction data. This analysis can advantageously identify whether the electronic resources are effective or ineffective and should be recommended for further assignment to users. For example, if an educator completed an electronic resource assignment made by an administrator to address a deficiency and, in a later assessment, was found to not have improved, the analytics module 228 can identify the electronic resource as having been ineffective for that user and store or provide analysis data evidencing such for provision to the educator's administrator in a report. In a further example, if that same resource is identified as having been ineffective for several users, the analytics module 228 may record evidence of such for provision in a report to the administrator. In some instances, the analytics module 228 may determine the effectiveness of the resources based on the level and/or pervasiveness of the users' improvements.

As an eighth example, the analytics module 228 may generate user alignments. A user alignment may connect two or more users based on one or more compatibility matches. Users may be matched as compatible by the analytics module 228 based on one or more common or compatible attributes, as reflected by the demographics data, content data, interaction data, standards data, assessment data, achievement data, profile data, a social graph stored in the data store 206, etc. The alignment module 232 may access the data from the data stores 206, 208, 140, 150, 160, and/or 166, or may receive it directly from the other modules of the application engine 104. Non-limiting examples of user alignments include colleague alignments, mentor alignments, learning community alignments, etc. As a further example, a user alignment may align one or more users with high performance levels relative to an applicable standard and one or more users with low performance levels relative to the same or an associated standard to provide mentoring for the one or more underperforming users. For example, the alignment module 232 may determine, based on assessment data, achievement data, and standards data, which educators are highly proficient relative to various standards and which educators are poorly proficient relative to those standards, and may align the highly proficient educators to be mentors to the poorly proficient educators. In another example, the user alignment may align two or more users whose performance levels meet or exceed an applicable standard, for example, to form a leadership or mentors group. Conversely, two or more users with low performance levels may be aligned for training, collaboration, and support.

As a ninth example, the analytics module 228 can compare performance-related data (e.g., assessment data, achievement data, etc.) of the users of different organizations to determine which organizations have the most effective users and then identify the workflows that those organizations used to achieve effectiveness. The analytics module 228 can tag these effective workflows as preferred and store them as recommendations for other organizations in reports generated by the reporting module 230. In some instances, analytics module 228 can compare demographics data of effective organizations to that of a target organization (that is struggling) to identify an effective organization having characteristics similar to the target organization. The analytics module 228 can then recommend a workflow, which was used by the effective organization to overcome various challenges facing the target organization, to the target organization. This is advantageous as it provides the target organization with a workflow that has been proven to be effective and is targeted to the demographics and needs of the target organization.

The analytics module 228 is capable of segmenting the analytics it generates based on data type or attribute, including, for example demographics, performance, user attributes, standards, goals, and. For instance, in an educational setting, the analytics may be segmented by individual pupils, educators, administrators, etc., groups of pupils, educators, administrators; region; district; school; classroom; grade; location; educator; student; class-size; gender; ethnicity; race; spoken language; educator attributes; student attributes; public policy; legislation; standards; goals; workflows; requirements; performance level; performance score; assessments; achievements; or the like.

The analytics module 228 is communicatively coupled to the data stores 112, 140, 150, 160, 166, and 206 and is capable of accessing the data stored by the data stores 112, 140, 150, 160, 166, and 206 to generate the analytics described herein. Additionally, the analytics module 228 is capable of storing the analytics it generates in a data store, such as the data store 206, for later access and retrieval by the other components of the application engine 104, such as the reporting module 230 and/or the management module 222. Additionally or alternatively, the analytics module 228 can provide the analytics it generates directly to the other components of the application engine 104, such as reporting module 230 and/or the management module 222, for use thereby.

The reporting module 230 is software, code, logic, or routines for generating and sending the reports to users of the application engine 104 for presentation. In some embodiments, the reports are rich, informative reports describing the effectiveness of an organization, its users, and/or the electronic resources provided for the development of those users relative to various goals, standards, and workflows.

In some embodiments, the reporting module 230 generates the reports based on the analytics produced by the analytics module 228 and/or the data generated or aggregated by the application engine 104 or the components thereof. The reporting module 230 may be coupled to the various data stores 206, 208, 140, 150, 160, 166, and 112, of the system 100 and/or the server 102 to retrieve the data stored therein. In some embodiments, the reporting module 230 may signal the analytics module 228 to generate analytics data. For example, the reporting module 230 may specify to the analytics module 228 the type of analytics that it needs generated or the analytics module 228 may independently make this determination based on pre-defined parameters or information. Once the analytics have been generated, the analytics module 228 may provide them directly to the reporting module 230 or may store them in a data store, such as the data store 206, for access by the reporting module 230. For example, the reporting module may be communicatively coupled to the analytics module or a data store, such as the data store 206, to receive analytics data for the user(s) and may generate the report to include the analytics data (e.g., effectiveness score(s)) to give the user designated to receive and interpret the report an indication as to how various user(s) are performing. The reporting module 230 may be coupled to the analytics module 228 (e.g., via the processor 202) to receive the analytics data.

While the reporting module 230 and analytics module 228 are depicted as monolithic entities, it should be understood that these entities may take other forms. For instance, the reporting module 230 and analytics module 228 may be integrated into a signal entity or divided into additional functional components and still fall within the scope of this disclosure.

The reporting module 230 is capable of generating a report in response to receiving a trigger signal. In some embodiments, the trigger signal may be provided by the management module 222. For instance, a user interacting with the management module 222 may request a progress report for a workflow that has been defined and, responsive to receiving this signal, the reporting module 230 may generate the report based on the management data associated with the workflow, the users associated with the workflow, and the data associated with those users including one or more of analytics data, assessment data, achievement data, demographics data, standards data, user profile data, interaction data, etc. The reporting module 230 may then provide the report to the management module 222 for provision to the user or may provide it directly to the user (e.g., via the communication unit 210 and the network 120).

In other embodiments, the trigger signal may be received in the form of a report request provided by a user via a client application 130. For example, an administrator of an organization may input a command into his/her user device 118 via the client application 124 commanding that a report be generated describing the effectiveness of a specific branch of his organization. Responsive to receiving the command, the client application 124 may generate and send a report request via the network 120 to the reporting module 230, thus triggering the reporting module 230 to generate and send the report for presentation. In yet other embodiments, the trigger signal may be provided by the assessment module 226, the analytics module 228, or the aggregator 232.

The reporting module 230 is capable of automatically and independently generating reports at various intervals, times, etc. For example, the reporting module 230 may automatically generate reports for some or all of the organizations and/or users registered to use the educational platform provided by the application engine 104. In some embodiments, the reporting module 230 may provide the report for presentation via the dashboard of the client application 124, provide the report for download as a portable document, transmit the report via electronic message (e.g., via email, instant message, text message, etc.) to one or more users, etc.

The reporting module 230 may store any reports and/or data generated by it in a data store, such as the data store 206, for later access by the reporting module 230 or any other component of the professional development server 102, such as the management module 222, the content module 224, the assessment module 226, or the reporting module 230 itself.

In some embodiments, the reports generated by the reporting module 230 can organize the analytics generated by the analytics module 228 as well as goals and workflows defined via the management module 222 into an accessible and easy-to-consume format. In some embodiments, these reports are viewable via a dashboard presented by the client application 126. For example, the dashboard can provide a user, such as an administrator, with detailed information about an organization's effectiveness in achieving established goals and workflows, and providing the user with informative graphical detail and rich analytics that make it easy for the user to quickly ascertain how well the organization is performing. The dashboard can also provide the user with cascading levels of analytical detail that he or she can easily drill down into to view the data in more granular segments. For example, the data in the reports may be segmented as described above with respect to the analytics module 228, and the user may filter the data using those segments to better understand the make-up of his/her organization, reveal deficiencies or proficiencies that may be unique to a particular segment as well as the factors that may be causing those deficiencies or proficiencies. In a further example, the data in the reports can be viewed to follow any hierarchical or non-hierarchical structure. For instance, the data may be viewed by nation, area, state, region, district, school, grade level, classroom, educator, subject, state/common core/national/international standard, student, performance level, content consumed, evaluator, observer, student demographic data (e.g., income level, race, etc.), professional learning community, or any other data type, demographic, or category discussed herein.

By way of example, in an educational setting, a school principal may be performing annual evaluations of his/her educators or visiting the classrooms of a number of his/her educators to perform observational assessments. During these engagements, the principal may, using the dashboard displayed on his/her wirelessly connected client device (e.g., tablet computer), view an overall performance score and summary for that educator; view the educator's performance over time; view assessment and achievement data (e.g., teacher or student) for that educator including any formal and informal assessments, student reviews, parent reviews, peer reviews, the test scores of the educator's students; the perceptions of the educator's students; determine the deficiencies the educator has, has been working on, or has been improving on; view any electronic resources the educator has been assigned, view the electronic resources the educator has consumed; view any work-product, lesson plans, curriculum maps, videos, presentations, etc., the educator has uploaded, the professional learning communities and groups the educator has interacted with, any mentors, coaches, etc., the educator has been working with, etc. Using this information, the principal may quickly get up-to-speed on where each educator is at, and may use this information in managerial decisions and to modify existing or define new goals and workflows and assign electronic resources to help the users of the organization individually and collectively become more effective.

As a further example, the reporting module 230 can give one or more users (e.g., supervisors, administrators, executives, directors, managers, principals, assistant principals, reviewers, observers, etc.) feedback on the effectiveness of an organization, its goals and management processes and workflow, its users, the assessments of those users, the electronic resources consumed by and assigned to those users, etc. This allows the one or more users' receiving the feedback to be adaptive and make any necessary adjustments, such as modifying existing or setting new goals, workflows, electronic resource assignments, user alignments, etc.; targeting user needs and weaknesses by assigning resources that training and resources that are proven to help users address these needs and weaknesses; identify which electronic resources have been ineffective; align users determined to be effective as mentors to those that are struggling; taking disciplinary action; making structural changes to the organization; etc.

In addition, the reports generated by the reporting module 230 may include recommendations for user alignments and electronic resources. For instance, the report may recommend mentors for the users, learning communities for the users to participate in, colleagues who teach the same subject, have the same student mix, or have other attributes in common with the user, for the user to connect with, recommend electronic resources for users to consume based on their needs, summarize electronic resource assignments, etc., which can provide the benefit of helping the educators become better at working with and teaching their students and ultimately preparing them all to be college and career ready. In another example, if an observer assigns a target user to watch a video on achieving effective classroom management via the professional development service, the reporting module 230 can generate status updates about the target user's progress on watching the video and send them to the observer. The reporting module 230 can also report on the target user's additional efforts to develop his/her skills by reporting on what other electronic training resources the target user has consumed since the observer made the assignment, provided the target user provides his/her consent for doing so via an associated privacy settings interface.

The application engine 104 or any of its components and provide data to client devices 124 may provide the data with presentational information and the client application may use the presentational information to form the look and feel of the user interfaces. In other implementations, the client application receiving the data may determine the formatting and look and feel of the user interfaces independently. Using the user interfaces presented by the client application, such as the interface 700 in FIG. 7, the user can input commands selecting various actions.

The aggregator 232 is software, code, logic, or routines for aggregating data from various information sources that can be used for making assessments and generating analytics, reports, and the like. The aggregator 232 may aggregate, via the communication unit 210, the data from various information sources coupled to the network 120 (e.g., 112, 116, 134, 140, 144, 150, 154, 166, etc.) and store it locally in one or more data stores. In some embodiments, the aggregator 232 replicates the data stored in remote instances of data stores 140, 150, 160, 166, and 112 in local instances of those data stores. In other embodiments, the aggregator 232 can store the data aggregated from the remote sources in the data store 206. In yet other embodiments, some or all of the data aggregation can be omitted by incorporating one or more of the data stores 140, 150, 160, 166, and 112 into the server 102.

In some embodiments, the aggregator 232 may aggregate the data at regular intervals. For example, a batch program operating periodically (every few minutes, hours, days, weeks, etc.) may replicate the data stored in data stores 140, 150, 160, and 166 to one or more data stores of the server 102. In other embodiments, the aggregator 232 may retrieve data real-time.

Data aggregated or generated by the aggregator 232 and the other modules of the application engine 104, including, for example, content module 224, the assessment module 226, and the reporting module 230, is collectively referred to as aggregated data. For example, aggregated data may include, but is not limited to, demographics data, content data, interaction data, standards data, achievement data, assessment data, perceptions data, and profile data.

Additional structure and functionality of various elements of the application engine 104 and the system 100 are further described below with reference to FIGS. 3-7.

Example Methods

Figure 3:
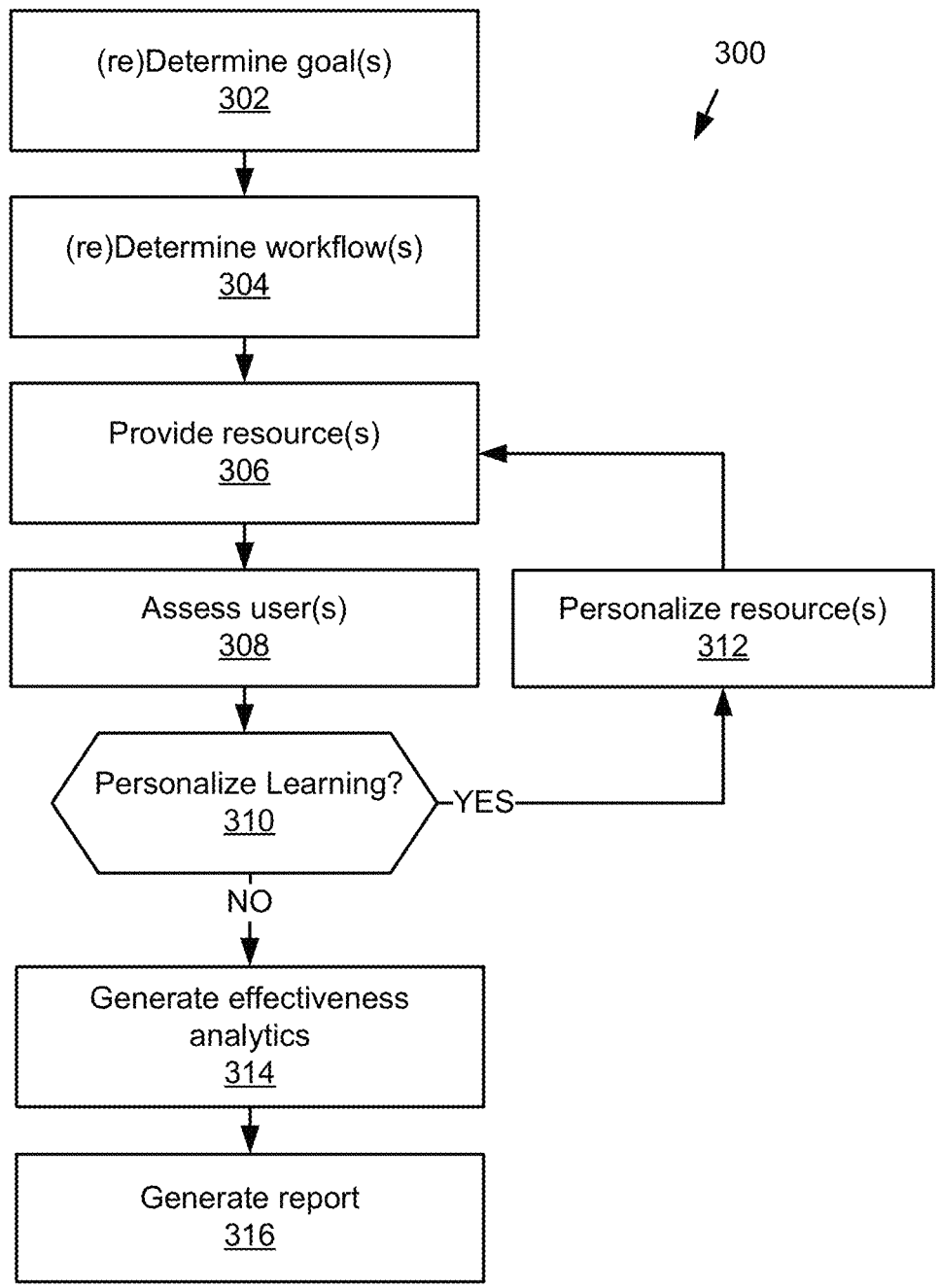
FIG. 3 is a flowchart of an example method for managing user development and effectiveness.

FIG. 3 describes an example method 300 for managing user development and effectiveness. In blocks 302 and 304, the method 300 determines one or more goals and workflows. The goal(s) and workflow(s) can be determined by receiving a definition of them, as input by a user. For instance, the user may define a workflow based on a goal and submit it to the management module 222 via an associated user interface. A goal, for example, can be goal for a plurality of users of an organization to meet and the workflow can define a way to achieve the goal.

In block 306, the method 300 can provide electronic resources to one or more users of the organization using the educational platform. The electronic resources may be tied to the goal/workflow. For instance, the workflow may set forth a development plan for the users of the organization to follow and specify electronic resources for the users to consume. As a further example, a user, upon logging in to utilize the educational platform, can be presented with an interface by the content module 224 that includes a summary of the electronic resources that have been specified for the user to consume in a process template associated with a workflow. In other instances, the method 300 proceeds to block 308 without providing electronic resources to some or all of the users.

The method 300 then assesses, in block 308, one or more users associated with the organization. The method 300 may assess a user by determining an assessment of a target user's performance. The assessment can be based on a workflow defined in block 304. In some instances, the assessment is determined, at least in part, using assessment and/or achievement data, such as assessment data received from an observer of the target user or assessment and/or achievement data aggregated from one or more information sources.

In block 310, the method 300 can personalize learning for the target users based on the performance assessments. In some instances, to personalize learning, the method 300 can, in block 312, personalize one or more electronic resources to address one or more needs of one or more target users based on the performance assessments determined in block 308. For example, to personalize an electronic resource to the target user, the assessment module 226 can determine an electronic resource based on the assessment of a performance of the target user and assign the electronic resource to the target user for completion. In another example, to personalize the electronic resource, the assessment module can signal the content module to adapt a content of the electronic resource to address a need of the first user as reflected by the assessment of the performance.

The one or more personalized resources can then be provided by the method 300 to the one or more corresponding target users for consumption. In some instances, the learning of the user(s) can further be personalized using the same, additional, or replacement electronic resources by repeating the operations in blocks 306, 308, 310, and 312. For instance, after a target user has completed the assignment of an electronic resource, the performance of a target user can be re-assessed in block 308 to determine whether the user has improved and/or is using the techniques/skill taught by the electronic resource.

Next, the method 300 can generate effectiveness analytics in block 314 describing, for example, the effectiveness of the electronic resources, an organization, its one or more users, etc. In some instances, the method 300 can generate an effectiveness report and provide it to one or more users for presentation. In some instances, the effectiveness report is generated based on analytics data. Additionally or alternatively, the report may include other data received and/or stored by the server 102, such as the management data, assessment data (e.g., observation data), achievement data, demographics data, standards data, interaction data, etc. In one non-limiting example, when generating an effectiveness report, the method can calculate one or more effectiveness scores (e.g., effectiveness analytics) for one or more users to be included in the report based on the performance assessments of those users and generate the report to include the effectiveness score(s).

The method 300 is advantageous in a number of respects including, for instance, providing users with personalized learning targeted to the needs of a user based on the user's performance/progress, and providing administrators with effectiveness analytics that can help them optimize their organizations goals, workflows (e.g., internal processes), resource assignments, etc., and filter out the electronic resources that are not effective.

Figure 4:
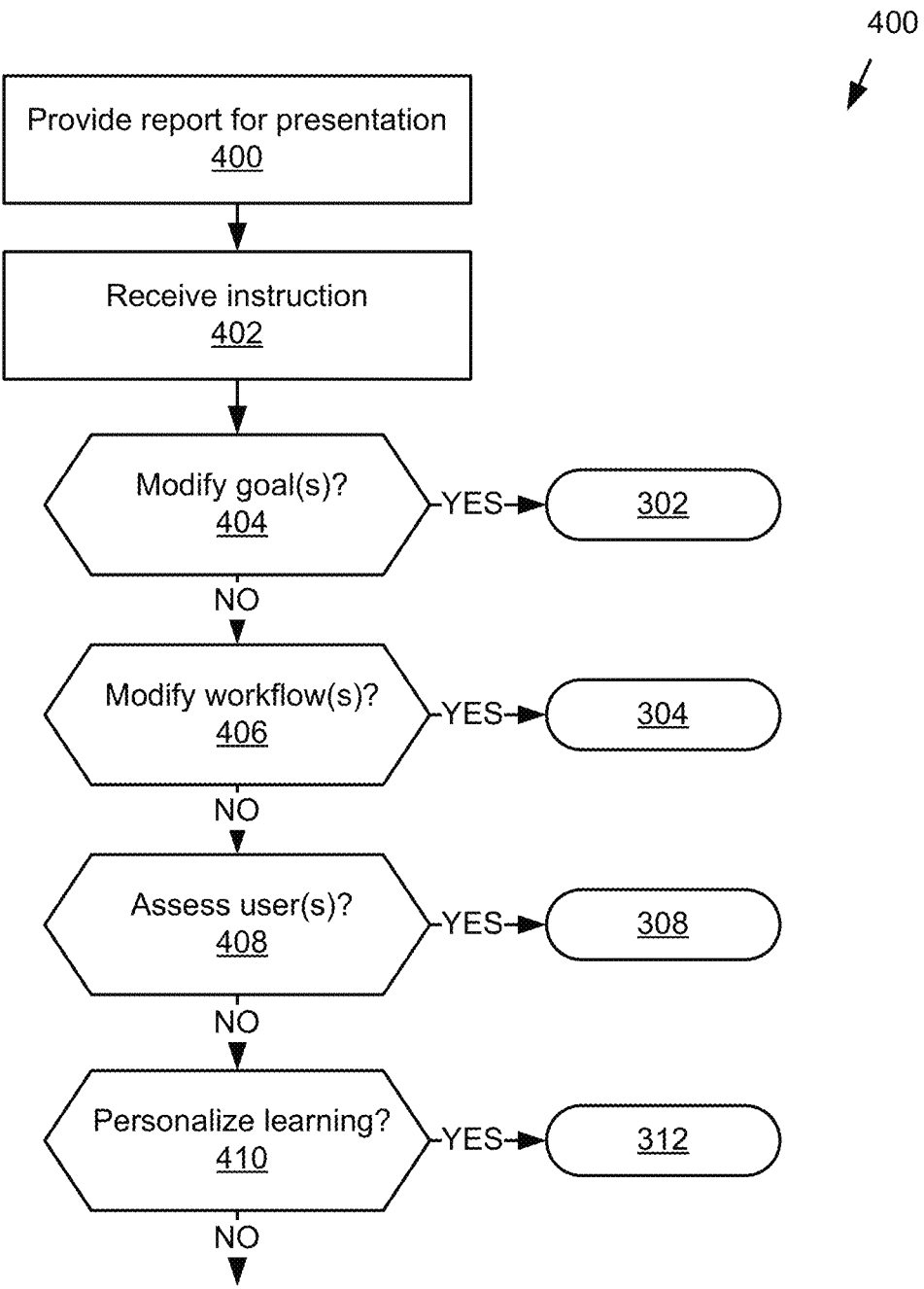
FIG. 4 is a flowchart of an example method for re-evaluating a development plan, re-assessing users, or personalizing learning based on a report.

FIG. 4 describes an example method 400 for re-evaluating a development plan, re-assessing users, or personalizing learning based on a report. In block 400, the method provides a report for presentation to a user. In some instances, the report may be generated by the operations performed in block 316 of method 300 and provided by the application engine 104 via the network 120 for presentation. In yet other instances, the report may be provided by another entity of the system 100.

The method 400 continues by receiving an instruction in block 402 based on the report. In some instances, the instruction may be received from a target user described in the report or from a user that oversees the target user, such as a supervisor or administrator. The method 400 then determines in blocks 404, 406, 408, and 410 whether the instruction is an instruction to modify a goal or workflow, assess one or more users, or personalize learning for one or more users, respectively. In particular, if, the method 400 determines, in block 404, to modify a goal or, in block 406, to modify a workflow, the method 400 proceeds to block 302 or 304, respectively, and re-determines one or more goals or one or more workflows, respectively. For instance, in an educational setting, the method 400 enables a principal of a school to adjust or replace a school-wide goal and/or workflow responsive to receiving a report about the effectiveness of his/her educators. If the method 400 determines in block 408 to assess one or more users, the method 400 continues to block 302 or 304 and proceeds with the assessment or re-assessment. Similarly, if the method 400 determines in block 410 to personalize the learning of one or more users, the method 400 proceeds to block 312 to personalize the one or more electronic resources, for example, by assigning or re-assigning electronic resources or by customizing a content of the electronic resources to the needs of the users. Once the processing in blocks 302, 304, 308, and 312 is complete, the method 400 may terminate or may continue processing each subsequent block through to block 316, where a report is generated to reflect any changes.

The method 400 is advantageous in a number of respects including providing users continuous feedback as to their own effectiveness, the effectiveness of the users and organizations that they oversee, and the electronic resources used by them. This enables users, particularly those in administrative roles, to make adjustments to the goals, workflows, development plans, resource assignments, etc., in an effort to adapt to and meet the needs of the users and organizations they oversee and thereby increase the overall effectiveness of those users and organizations.

Figure 5:
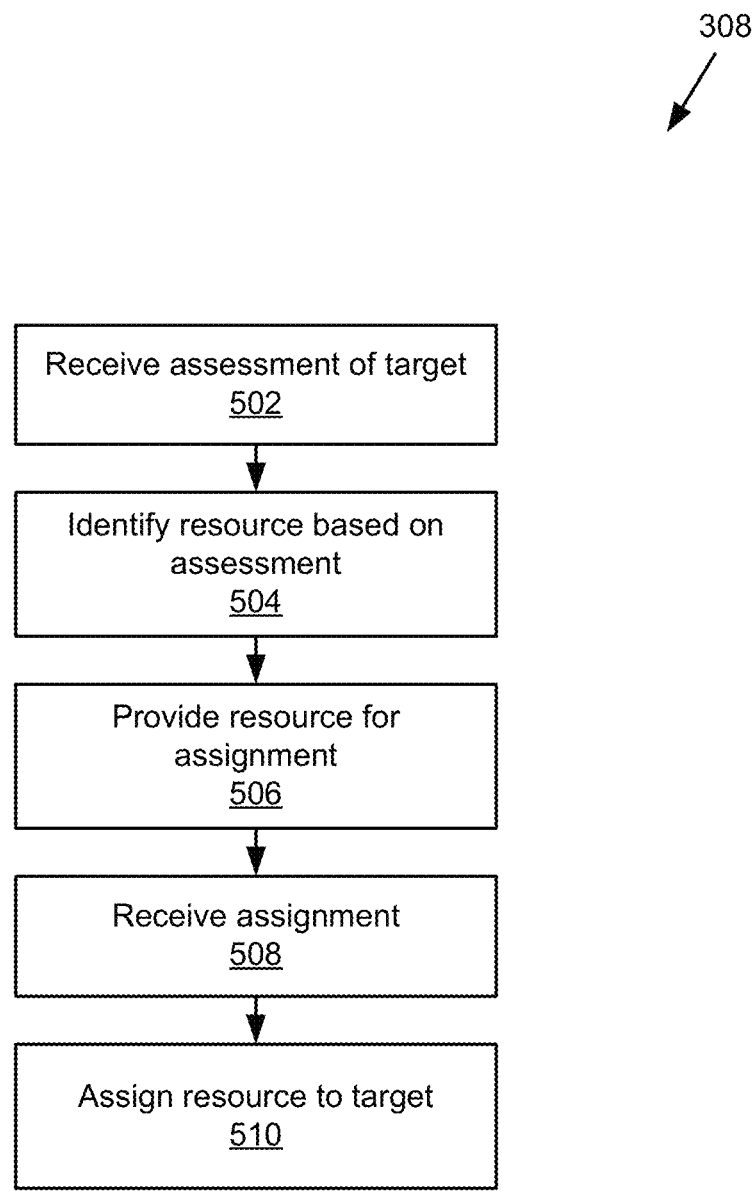
FIG. 5 is an example method for assessing a target user and assigning a resource.

FIG. 5 describes an example method 500 for assessing a target user and assigning a resource. In block 502, the method begins by receiving an assessment of a target user and identifying, in block 504, an electronic resource based on the assessment. In some embodiments, the assessment is received in the form of assessment data and the method 500 identifies the one or more electronic resources by querying a library of electronic resources for resources that match one or more aspects of the assessment data. In some cases, if more than one electronic resource is identified, they can be ranked and filtered (e.g., by the content module 224 and/or the assessment module 226) so the electronic resources that are the most suitable for a target user can be recommended.

Next, the method 500 provides the one or more electronic resources for assignment to the target user. In some embodiments, a summary of the one or more electronic resources are provided to an observer, such as a supervisor or administrator, for assignment to target user that he/she is observing. For example, the client device 126 of the observer may receive a summary of training videos and may display the summary to the observer via a user interface. The observer may use the interface to preview the videos or other resources and/or assign one or more of the videos or other resources to the target user.

Next, the method 500 receives an assignment of one or more electronic resources in block 508 and assigns the one or more electronic resources to the target user. In some embodiments, the assignment includes parameters governing how the assignment of the electronic resource(s) is to be completed. For example, an assignment parameter could include a due date, a level of interaction with the electronic resource that is required to complete the assignment, an additional requirement that must be satisfied for completion of the assignment, etc. In some embodiments, the one or more electronic resources are assigned by associating them with the target user. For instance, the assessment module 226 or another component of the application engine 104 can store record of the assignment in the data store 206 in association with a user profile of the target user.

Figure 6:
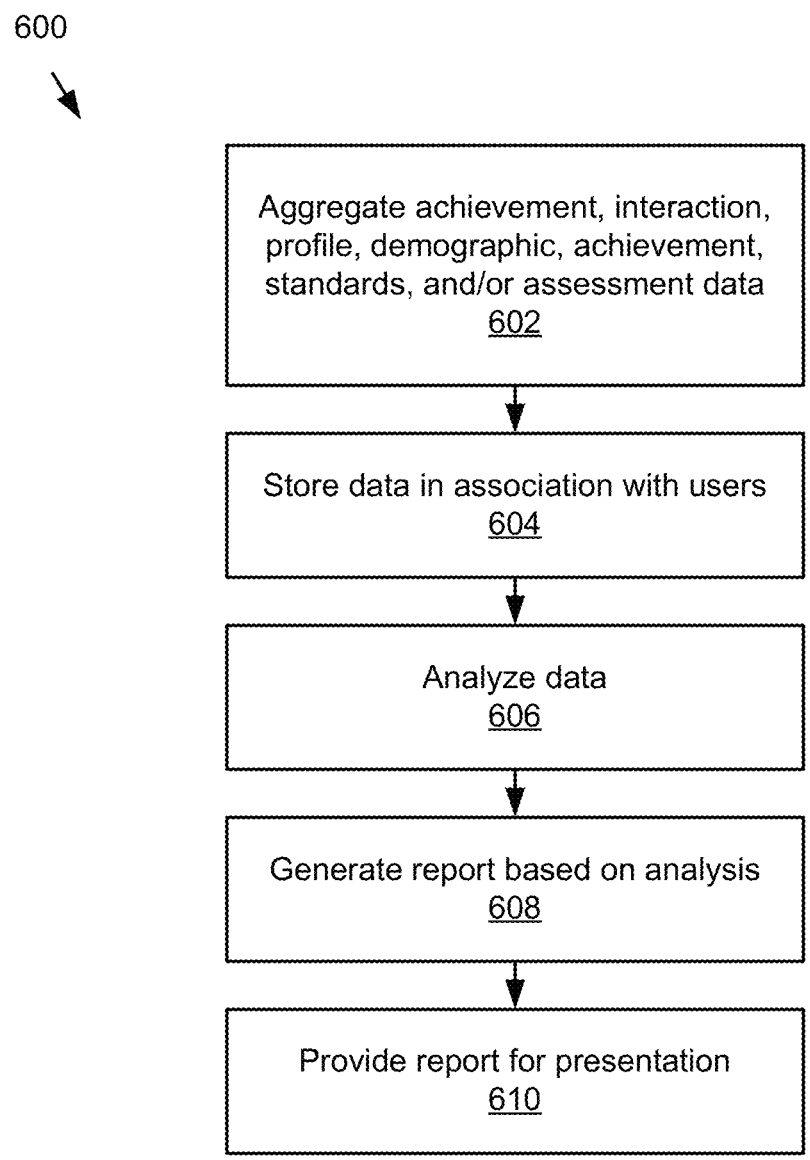
FIG. 6 is flowchart of an example method for automatically generating an effectiveness report.

FIG. 6 describes an example method 600 for automatically generating an effectiveness report. In block 602, the method 600 aggregates demographics data, content data, interaction data, standards data, achievement data, assessment data (e.g., various observation data), and profile data, and store 804 the data in association with the users of the application engine 104. The data may be aggregated from data stores 112, 140, 150, 160, and 166, from client devices 124, or may be aggregated (e.g., received or generated) by performing the various operations discussed herein. Next, the method 800 analyzes the aggregated data in block 606 and generates effectiveness analytics based thereon. For example, the alignment module 232 may analyze the aggregated data and determine which users are proficient or lacking proficiency relative to various goals, workflows, standards, etc., determine the electronic resources have been effective or ineffective at helping users improve, determine which workflows have been effective at helping users become and stay proficient relative to various goals, standards, etc. The method 600 can then generate a report based on the analysis performed in block 606 and provide it for presentation to a user.

It should be understood that the embodiments described in this disclosure are provided by way of illustration and example and should not be considered limiting, and that other variations and combinations of these embodiments are contemplated and within the scope of the present disclosure. Moreover, unless stated otherwise, the various different embodiments described herein should not be considered as being mutually exclusive and can be integrated in various ways, or may be further divided into various discrete devices, components, and methods. For example, various operations of the method 300 may be expanded upon by operations included in one or more of methods 400 and 500, or by concatenating and/or substituting various blocks from these methods, all of which are encompassed by the present disclosure. Further, it should be understood that, in some instances, the methods 300-600 may be iterated more than one time to produce additional results. Additionally, the usage of the terms first, second, etc., in various places in this disclosure does not necessarily imply a specific order or rank, and is used in some cases to help the reader discern between various objects, items, elements, etc.

Example User Interface

Figure 7:
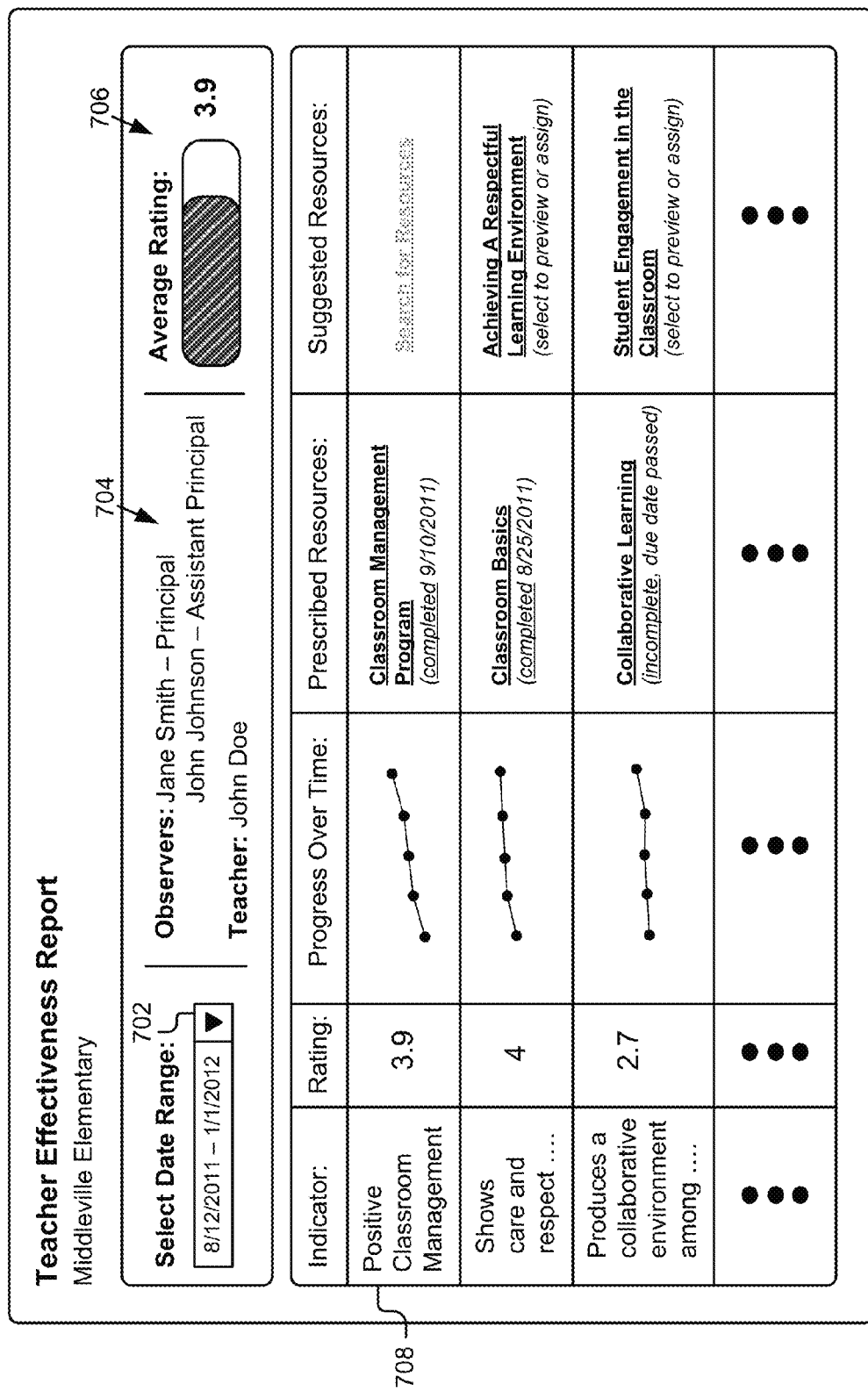
FIG. 7 is a graphical representation of an example effectiveness report.

Referring now to FIG. 7, an example effectiveness report 700 is described. It should be understood that the report illustrated in FIG. 7 is provided merely by way of example, and that other reports containing different or additional information may be generated and presented. For example, various user interfaces may be produced to display reports and statistics, display dialogs, define goals and workflows, set parameters and settings, conduct assessments, provide recommendations, send electronic communications, view, listen to and/or interact with the electronic resources provided by the professional development service, etc.

In the depicted embodiment, example report 700 is displayed via a user interface including various interactive user interface elements. In this particular example, the example report 700 includes a date selector 702, meta data fields 704, a score indicator 706, and a summary region 708. The date selector 702 allows the viewing user to limit the information in the report to a certain date range or to remove any date range restrictions. The metadata fields 704 include information about the educator and the users who have assessed the performance of the educator. The score indicator 706 depicts an overall score rating the educator's effectiveness, which is calculated based on the educator's performance relative the indicators (e.g., goals, standards, etc.) depicted in the summary region 708.

The summary region 708 includes information describing the performance of the educator of a school (e.g., Middleville Elementary) relative to the indicators (e.g., goals), which may be defined in a workflow, such as in a process or assessment template. The summary region 708 also includes a chart charting the educator's performance/progress over time, the resources that have been prescribed/assigned to the educator and whether the educator completed those assignments, and suggestions for additional resources that can be assigned. For example, selection of the title of a prescribed resource may display a window or dialog including information about the assignment of that resource, options to preview the electronic resource (e.g., video), and information about the resource, others who have consumed it, and its effectiveness. In another example, selection of the title "Search for Resources" may display a window or dialog for searching for a resource related to the corresponding indicator or for searching for any electronic resource applicable to the educator. While not depicted, other user interfaces for viewing the information or performing the functionality described in this disclosure are also contemplated and fall within its scope. These include, for instance, user interface elements for navigating to, viewing, and editing goals and workflows, viewing the observation files, performing assessments, viewing and navigating analytics, demographics, user, standards, assessment, achievement, interaction, management data, etc., receiving and sending electronic messages, or the like.

Various embodiments for managing user development and effectiveness have been described. In the above description, for purposes of explanation, numerous specific details are set forth in order to provide a thorough understanding of the present disclosure. It should be understood that the technology described in the various example embodiments can be practiced without these specific details. In other instances, structures and devices are shown in block diagram form in order to avoid obscuring the description.

Reference in the present disclosure to "some embodiments," "an embodiment," "an example embodiment," "other embodiments," etc., means that a particular feature, structure, or characteristic described in connection with the embodiment is included in at least one embodiment of the description. The appearances of the phrase "in some embodiments" in various places in the present disclosure are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including, for example, "processing" or "computing" or "calculating" or "ranking" or "identifying" or "determining" or "displaying" or "receiving" or "conducting" or "collecting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the present disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium including, for example, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The present disclosure can take the form of an entirely hardware embodiment, an entirely software embodiment or an embodiment containing both hardware and software elements. In some embodiments, the present disclosure is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, wireless adapters, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description. In addition, the present disclosure is not described with reference to any particular programming language. It will be appreciated that a variety of programming languages may be used to implement the teachings of the present disclosure as described herein.

It is intended that the scope of the disclosure be limited not by this detailed description, but rather by the claims of this application. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory or significant, and the mechanisms that implement the present disclosure or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the present disclosure is implemented as software, the component can be implemented as a standalone program, as part of a larger program, as a plurality of separate programs, as a statically or dynamically linked library, as a kernel loadable module, as a device driver, and/or in every and any other way. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
    presenting, via a display of a user device, an interface for defining a workflow including a process template for defining an organization-wide development plan and an assessment template for evaluating performances of members in an organization, the process template including user-definable steps for achieving one or more organizational goals and tracking progress of a multiplicity of members of the organization relative to the one or more organizational goals, the assessment template including fields for assessing how the users are performing relative to the goals and fields for prescribing personalized electronic resources to address assessed needs of the members;
    receiving, via an input device of the user device, input defining the user-definable steps of the process template including specific electronic resources for the multiplicity of members of the organization to consume and a schedule for completing consumption of the specific electronic resources;
    receiving, via an input device of the user device, input defining the fields of the assessment template for assessing the members;
    submitting the workflow including the process template and the assessment template as defined for storage in a non-transitory data store;
    generating effectiveness analytics including effectiveness scores for the multiplicity of members of the organization using management data describing the workflow, and one or more of assessment data, achievement data, standards data, and interaction data associated with the multiplicity of members of the organization, the effectiveness scores respectively quantifying how effectively the multiplicity of members of the organization are meeting the steps of the process template including consumption of the electronic resources; and
    generating and displaying a virtual dashboard, via the display of the user device, providing an administrator with a summary pages having a summary of one or more members of the organization including the one or more members progress over time effectiveness relative to the workflow, the virtual dashboard including one or more reports having the effectiveness scores of the multiplicity of members, effectiveness data regarding the electronic resources of the workflow, and one or more electronic resource recommendations generated based on the effectiveness analytics, the dashboard further including one or more user-selectable filters for viewing data in the one or more reports according to one or more granular segments.

2. The computer-implemented method of claim 1, wherein the workflow further includes one or more assessment templates for assessing how the multiplicity of members of the organizations are performing relative to the organizational goals of the workflow, the assessment template including includes assignment fields populated with the specific electronic resources defined by the process template, the method further, comprising:
    receiving, using one or more computing devices, assessment data describing assessments performed by one or more observers using the one or more assessment templates specified by the workflow;
    prescribing, using the one or more computing devices, a personalized electronic resource from the specific electronic resources to one or more of the members using at least one of the one or more assessment templates;
    receiving, using the one or more computing devices, interaction data describing a consumption of the personalized electronic resource by the one or more of the members to which the personalized electronic resource is prescribed, the consumption of the personalized electronic resource reflecting a learning activity being performed by the one or more of the members;
    performing, using the one or more computing devices, a subsequent assessment of each of the one or more of the members to determine whether the one or more of the members have progressed relative to the goal since consuming the personalized electronic resource, wherein the one or more effectiveness analytics are further generated to describe whether the personalized electronic resource was effective at helping the one or more of the members progress relative to the goal; and
    personalizing the personalized electronic resource by determining the electronic resource based on one or more of the assessments of how the members are performing relative to the goal.

3. The computer-implemented method of claim 2, wherein personalizing the personalized electronic resource further includes adapting a content of the personalized electronic resource to address a need of the one or more of the members as reflected by the one or more of the assessments.

4. The computer-implemented method of claim 1, wherein the specific electronic resources of the workflow embody development tasks and the method further comprises:
    tracking a consumption of the specific electronic resources by the multiplicity of members of the organization; and
    determining a compliance of the members with the organizational goals of the workflow based on the consumption, wherein generating the effectiveness analytics is further based on the compliance of the members.

5. The computer-implemented method of claim 1, wherein the generating the effectiveness analytics includes calculating an organization effectiveness score based on the assessments of the members in the aggregate, wherein one or more of the reports are generated to include the organization effectiveness score.

6. The computer-implemented method of claim 1, wherein the one or more assessment template includes one or more standards that are related to the organizational goals of the workflow, the method further comprising providing the one or more assessment template to at least one observer of the one or more observers to populate with observation data reflecting observations made by the at least one observer of a proficiency of each of the members while observing the members.

7. The computer-implemented method of claim 1, comprising:
providing, using the one or more computing devices, the report for presentation to a user registered as the administrator of the members;
receiving, using the one or more computing devices, an instruction from the administrator based on the report; and
modifying, using the one or more computing devices, one or more of the goal and the workflow based on the instruction.

8. The computer-implemented method of claim 1, comprising:
aggregating, using the one or more computing devices, demographics data, wherein the one or more effectiveness analytics included in the report are segmented based on the demographics data.

9. The computer-implemented method of claim 1, wherein the process template includes a certain timeframe for the members to complete one or more development tasks.

10. The computer-implemented method of claim 9, wherein at least one of the one or more development tasks includes consumption by the members of one or more electronic resources that provide training related to the goal, the one or more electronic resources including at least one or more of an online course, an electronic book, a video, a podcast, and an online learning community.

11. A computer program product comprising a non-transitory computer-usable medium including instructions which, when executed by a computer, cause the computer to:
present, via a display of a user device, an interface for defining a workflow including a process template for defining an organization-wide development plan and an assessment template for evaluating performances of members in an organization, the process template including user-definable steps for achieving one or more organizational goals and tracking progress of a multiplicity of members of the organization relative to the one or more organizational goals, the assessment template including fields for assessing how the users are performing relative to the goals and fields for prescribing personalized electronic resources to address assessed needs of the members;
receive, via an input device of the user device, in put input defining the user-definable steps of the process template including specific electronic resources for the multiplicity of members of the organization to consume and a schedule for completing consumption of the specific electronic resources;
receive, via an input device of the user device, input defining the fields of the assessment template for assessing the members;
submit the workflow including the process template and the assessment template as defined for storage in a non-transitory data store;
generate effectiveness analytics including effectiveness scores for the multiplicity of members of the organization using management data describing the workflow, and one or more of assessment data, achievement data, standards data, and interaction data associated with the multiplicity of members of the organization, the effectiveness scores respectively quantifying how effectively the multiplicity of members of the organization are meeting the steps of the process template including consumption of the electronic resources; and
generate and display a virtual dashboard, via the display of the user device, providing an administrator with a summary pages having a summary of one or more members of the organization including the one or more members progress over time effectiveness relative to the workflow, the virtual dashboard including one or more reports having the effectiveness scores of the multiplicity of members, effectiveness data regarding the electronic resources of the workflow, and one or more electronic resource recommendations generated based on the effectiveness analytics, the dashboard further including one or more user-selectable filters for viewing data in the one or more reports according to one or more granular segments.

12. The computer program product of claim 11, wherein the workflow further includes one or more assessment templates for assessing how the multiplicity of members of the organizations are performing relative to the organizational goals of the workflow, the assessment templates including assignment fields populated with the specific electronic resources defined by the process template, wherein the instructions further cause the computer to: receive assessment data describing assessments performed by one or more observers using the one or more assessment templates specified by the workflow; prescribe a personalized electronic resource from the specific electronic resources to one or more of the members using at least one of the one or more assessment templates; receive interaction data describing a consumption of the personalized electronic resource by the one or more of the members to which the personalized electronic resource is prescribed, the consumption of the personalized electronic resource reflecting a learning activity being performed by the one or more of the members; perform a subsequent assessment of each of the one or more of the members to determine whether the one or more of the members have progressed relative to the goal since consuming the personalized electronic resource, wherein the one or more effectiveness analytics are further generated to describe whether the personalized electronic resource was effective at helping the one or more of the members progress relative to the goal; and personalize the personalized electronic resource by determining the electronic resource based on one or more of the assessments of how the members are performing relative to the goal.

13. The computer program product of claim 12, wherein the specific electronic resources of the workflow embody development tasks and the instructions further cause the computer to: track a consumption of the specific electronic resources by the multiplicity of members of the organization; and determine a compliance of the members with the organizational goals of the workflow based on the consumption, wherein to generate the effectiveness analytics is further based on the compliance of the members.

14. The computer program product of claim 12, wherein: to personalize the personalized electronic resource includes adapting a content of the personalized electronic resource to address a need of the one or more of the members as reflected by one or more of the assessments.

15. The computer program product of claim 11, wherein to generate the effectiveness analytics includes calculating an organization effectiveness score based on the assessments of the members in the aggregate, wherein one or more of the reports are generated to include the organization effectiveness score.

16. The computer program product of claim 11, wherein the one or more assessment template includes one or more standards that are related to the organizational goals of the workflow, wherein the instructions further cause the computer to provide the one or more assessment template to at least one observer of the one or more observers to populate with observation data reflecting observations made by the at least one observer of a proficiency of each of the members while observing the members.

17. The computer program product of claim 11, wherein the instructions further cause the computer to: provide the report for presentation to a user registered as the administrator of the members; receive an instruction from the administrator based on the report; and modify one or more of the goal and the workflow based on the instruction.

18. The computer program product of claim 11, wherein the instructions further cause the computer to: aggregate demographics data, wherein the one or more effectiveness analytics included in the report are segmented based on the demographics data.

19. The computer program product of claim 11, wherein the process template includes a certain timeframe for the members to complete one or more development tasks.

20. The computer program product of claim 19, wherein at least one of the one or more development tasks includes consumption by the members of one or more electronic resources that provide training related to the goal, the one or more electronic resources including at least one or more of an online course, an electronic book, a video, a podcast, and an online learning community.

21. A system comprising:
a processors, and;
a memory storing instructions that, when executed, cause the system to:
present, via a display of a user interface, an interface for defining a workflow including a process template for defining an organization-wide development plan and an assessment template for evaluating performances of members in an organization, the process template including user-definable steps for achieving one or more organizational goals and tracking progress of a multiplicity of members of the organization relative to the one or more organizational goals, the assessment template including fields for assessing how the users are performing relative to the goals and fields for prescribing personalized electronic resources to address assessed needs of the members;
receive, via an input device of a user device, input defining the user-definable steps of the process template including specific electronic resources for the multiplicity of members of the organization to consumer and a schedule for completing consumption of the specific electronic resources;
receive, via an input device of the user device, input defining the fields of the assessment template for assessing the members;
submit the workflow including the process template and the assessment template as defined for storage in a non-transitory data store;
generate effectiveness analytics including effectiveness scores for the multiplicity of members of the organization using management data describing the workflow, and one or more of assessment data, achievement data, standards data, and interaction data associated with the multiplicity of members of the organization, the effectiveness scores respectively quantifying how effectively the multiplicity of members of the organization are meeting the steps of the process template including consumption of the electronic resources; and
generate and display a virtual dashboard, via the display of the user device, providing an administrator with a summary pages having a summary of one or more members of the organization including the one or more members progress over time effectiveness relative to the workflow, the virtual dashboard including one or more reports having the effectiveness scores of the multiplicity of members, effectiveness data regarding the electronic resources of the workflow, and one or more electronic resource recommendations generated based on the effectiveness analytics, the dashboard further including one or more user-selectable filters for viewing data in the one or more reports according to one or more granular segments.

22. The system of claim 21, wherein the workflow further includes one or more assessment templates for assessing how the multiplicity of members of the organizations are performing relative to the organizational goals of the workflow, the assessment templates including assignment fields populated with the specific electronic resources defined by the process template, wherein the memory also stores instructions that, when executed, cause the system to:
receive assessment data describing assessments performed by one or more observers using the one or more assessment templates specified by the workflow;
prescribe a personalized electronic resource from the specific electronic resources to one or more of the members using at least one of the one or more assessment templates;
receive interaction data describing a consumption of the personalized electronic resource by one or more of the members to which the personalized electronic resource is prescribed, the consumption of the personalized electronic resource reflects a learning activity being performed by the one or more of the members;
perform a subsequent assessment of each of the one or more of the members to determine whether the one or more of the members have progressed relative to the goal since consuming the personalized electronic resource, wherein the one or more effectiveness analytics are further generated to describe whether the personalized electronic resource was effective at helping the one or more of the members progress relative to the goal; and
personalize the personalized electronic resource by determining the electronic resource based on one or more of the assessments of how the members are performing relative to the goal.

23. The system of claim 22, wherein the specific electronic resource of the workflow embody development tasks, wherein the memory also stores instructions that, when executed, cause the system to:
track a consumption of the specific electronic resources by the multiplicity of members of the organization; and determine a compliance of the members with the organizational goals of the workflow based on the consumption, wherein generating the effectiveness analytics is further based on the compliance of the members.

24. The system of claim 22, wherein personalize the personalized electronic resource further includes adapting a content of the personalized electronic resource to address a need of the one or more of the members as reflected by the one or more of the assessments.

25. The system of claim 21, wherein generate effectiveness analytics includes calculating an organization effectiveness score based on the assessments of the members in the aggregate, wherein one or more of the reports are generated to include the organization effectiveness score.

26. The system of claim 21, wherein the process template includes a certain timeframe for the members to complete one or more development tasks.

27. The system of claim 26, wherein at least one of the one or more development tasks includes consumption by the members of one or more electronic resources that provide training related to the goal, the one or more electronic resources including at least one or more of an online course, an electronic book, a video, a podcast, and an online learning community.

28. The system of claim 26, wherein the memory also stores instructions that, when executed, cause the system to:
provide the report for presentation to a user registering as the administrator of the members;
receive an instruction from the administrator based on the report; and
modify one or more of the goal and the workflow based on the instruction.

29. The system of claim 21, wherein the one or more assessment template includes one or more standards that are related to the organizational goals of the workflow, wherein the memory also stores instructions that, when executed, cause the system to provide the one or more assessment template to at least one observer of the one or more observers to populate with observation data reflecting observations made by the at least one observer of a proficiency of each of the members while observing the users.

30. The system of claim 21, wherein the memory also stores instructions that, when executed, cause the system to:
aggregate demographics data,
wherein the one or more effectiveness analytics included in the report are segmented based on the demographics data.

31. A system comprising:
means for presenting, via a display of a user device, an interface for defining a workflow including a process template for defining an organization-wide development plan and an assessment template for evaluating performances of members in the organization, the process template including user-definable steps for achieving one or more organizational goals and tracking progress of a multiplicity of members of the organization relative to the one or more organizational goals, the assessment template including fields for assessing how the users are performing relative to the goals and fields for prescribing personalized electronic resources to address assessed needs of the members;
means for receiving, via an input device of the user device, input defining the user-definable steps of the process template including specific electronic resources for the multiplicity of members of the organization to consume and a schedule for completing consumption of the specific electronic resources;
means for receiving input defining the fields of the assessment template for assessing the members;
means for submitting the workflow including the process template and the assessment template as defined for storage in a non-transitory data store;
means for receiving assessment data describing assessments performed by one or more observers using the one or more assessment templates specified by the workflow, the assessments describing how the users of the organization are performing relative to the goal; and
means for generating a summary report with a summary of one or more members of the organization including one or more members progress over time, prescribed resources, and one or more effectiveness analytics reflecting how the users of the organization are collectively performing relative to the goal of the workflow based on the assessments described by the assessment data and the workflow described by management data;
means for generating a report based on the one or more effectiveness analytics.

* * * * *